(12) United States Patent
Ono et al.

(10) Patent No.: US 10,394,326 B2
(45) Date of Patent: Aug. 27, 2019

(54) TACTILE SENSE PRESENTATION APPARATUS, SIGNAL GENERATION DEVICE, TACTILE SENSE PRESENTATION SYSTEM, AND TACTILE SENSE PRESENTATION METHOD

(71) Applicant: Sony Corporation, Tokyo (JP)

(72) Inventors: Akira Ono, Kanagawa (JP); Hiroshi Yoshida, Kanagawa (JP); Mikio Takenaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 15/128,161

(22) PCT Filed: Feb. 10, 2015

(86) PCT No.: PCT/JP2015/000607
§ 371 (c)(1),
(2) Date: Sep. 22, 2016

(87) PCT Pub. No.: WO2015/151380
PCT Pub. Date: Oct. 8, 2015

(65) Prior Publication Data
US 2017/0097681 A1    Apr. 6, 2017

(30) Foreign Application Priority Data

Mar. 31, 2014    (JP) .................................. 2014-074474

(51) Int. Cl.
*G06F 1/16* (2006.01)
*G06F 3/01* (2006.01)
(Continued)

(52) U.S. Cl.
CPC ............ *G06F 3/016* (2013.01); *G06F 1/1637* (2013.01); *G06F 3/0412* (2013.01);
(Continued)

(58) Field of Classification Search
CPC ........ G06F 3/016; G06F 3/041; G06F 3/0488; G06F 3/0416; G06F 2203/014;
(Continued)

(56) References Cited

U.S. PATENT DOCUMENTS 8,310,452 B2 * 11/2012 Takenaka ................ G06F 3/016
340/407.1
2005/0088417 A1    4/2005 Mulligan
(Continued)

FOREIGN PATENT DOCUMENTS

CN    103064510 A    4/2013
CN    103180802 A    6/2013
(Continued)

OTHER PUBLICATIONS

Extended European Search Report dated Oct. 17, 2017 in connection with European Application No. 15774210.7.
(Continued)

*Primary Examiner* — Sanjiv D. Patel
(74) *Attorney, Agent, or Firm* — Wolf, Greenfield & Sacks, P.C.

(57) ABSTRACT

[Solving Means] A tactile sense presentation apparatus includes a movable body, an actuator unit, and a signal generation unit. The actuator unit is connected to the movable body. The signal generation unit is configured to supply a driving signal to the actuator unit, the driving signal generating a vibration on the actuator unit, the vibration having within a period at least one of a plurality of different amplitudes and a plurality of different frequencies.

26 Claims, 20 Drawing Sheets

A

B

(51) Int. Cl.
  *G06F 3/0488* (2013.01)
  *G06F 3/0482* (2013.01)
  *G06F 3/041* (2006.01)
  *H04R 17/00* (2006.01)

(52) U.S. Cl.
  CPC .......... *G06F 3/0416* (2013.01); *G06F 3/0482* (2013.01); *G06F 3/0488* (2013.01); *G06F 3/04886* (2013.01); *G06F 2203/013* (2013.01); *H04R 17/00* (2013.01); *H04R 2499/11* (2013.01)

(58) Field of Classification Search
  CPC .................. G06F 3/04847; G06F 3/038; G06F 2203/0339; G06F 3/03547; G06F 3/0486; G06F 3/04883; G06F 2203/013
  See application file for complete search history.

(56) References Cited

U.S. PATENT DOCUMENTS

| | | | |
|---|---|---|---|
| 2005/0174336 A1* | 8/2005 | Nakayama | G06F 3/016 345/173 |
| 2007/0035526 A1* | 2/2007 | Takenaka | G06F 3/016 345/173 |
| 2008/0055277 A1* | 3/2008 | Takenaka | G06F 3/016 345/177 |
| 2008/0216578 A1 | 9/2008 | Takashima et al. | |
| 2011/0157052 A1* | 6/2011 | Lee | G06F 1/1626 345/173 |
| 2011/0248817 A1* | 10/2011 | Houston | A63F 13/06 340/4.2 |
| 2011/0310028 A1* | 12/2011 | Camp, Jr. | G06F 3/016 345/173 |
| 2012/0194463 A1 | 8/2012 | Tierling et al. | |
| 2013/0099907 A1* | 4/2013 | Ching | G06F 3/016 340/407.1 |
| 2013/0100046 A1* | 4/2013 | Chuang | G06F 3/016 345/173 |
| 2013/0215079 A1* | 8/2013 | Johnson | G06F 3/016 345/174 |
| 2013/0265268 A1* | 10/2013 | Okumura | G06F 3/0488 345/173 |
| 2014/0071071 A1* | 3/2014 | Hirose | G06F 3/0488 345/173 |
| 2014/0078102 A1* | 3/2014 | Araki | G06F 3/016 345/174 |
| 2014/0118127 A1* | 5/2014 | Levesque | G06F 3/016 340/407.2 |
| 2014/0208204 A1* | 7/2014 | Lacroix | G06F 3/016 715/702 |
| 2016/0328019 A1* | 11/2016 | Taninaka | G06F 3/016 |

FOREIGN PATENT DOCUMENTS

| | | |
|---|---|---|
| EP | 2587344 A1 | 5/2013 |
| JP | 2007-510977 A | 4/2007 |
| JP | 2013-093006 A | 5/2013 |
| JP | 2013-097438 A | 5/2013 |
| JP | 2013-541789 A | 11/2013 |
| WO | WO 2005-043368 A2 | 5/2005 |
| WO | WO 2012-063165 A1 | 5/2012 |

OTHER PUBLICATIONS

Communication pursuant to Article 94(3) dated Aug. 13, 2018 in connection with European Application No. 15774210.7.
Chinese Office Action dated Sep. 4, 2018 in connection with Chinese Application No. 201580015990.9 and English translation thereof.
International Search Report and Written Opinion and English translation thereof dated Mar. 17, 2015 in connection with International Application No. PCT/JP2015/000607.
International Preliminary Report on Patentability and English translation thereof dated Oct. 13, 2016 in connection with International Application No. PCT/JP2015/000607.
Japanese Office Action dated Jan. 8, 2019 in connection with Japanese Application No. 2016-511339 and English translation thereof.

\* cited by examiner

| Example 1 | Amplitude | Frequency |
|---|---|---|
| Waveform 1 | A | $f_1 < f < f_2$ |
| Waveform 2 | A | $f < f_1$, or $f_2 < f$ |

| Example 2 | Amplitude | Frequency |
|---|---|---|
| Waveform 1 | B | $f_0 < f$ |
| Waveform 2 | B | $f < f_0$ |

| Example 3 | Amplitude | Frequency |
|---|---|---|
| Waveform 1 | A | $f_1 < f < f_2$ |
| Waveform 2 | C | $f_1 < f < f_2$ |

| Example 4 | Amplitude | Frequency |
|---|---|---|
| Waveform 1 | A | $f_1 < f < f_2$ |
| Waveform 2 | C | $f < f_1$ |

TACTILE SENSE PRESENTATION APPARATUS, SIGNAL GENERATION DEVICE, TACTILE SENSE PRESENTATION SYSTEM, AND TACTILE SENSE PRESENTATION METHOD

CROSS-REFERENCE TO RELATED APPLICATIONS

This application is a National Stage of International Application No. PCT/JP2015/000607, filed in the Japanese Patent Office as a Receiving office on Feb. 10, 2015, which claims priority to Japanese Patent Application Number 2014-074474, filed in the Japanese Patent Office on Mar. 31, 2014, each of which is hereby incorporated by reference in its entirety.

TECHNICAL FIELD

The present technology relates to a tactile sense presentation apparatus, a signal generation device thereof, a tactile sense presentation system, and a tactile sense presentation method that are capable of presenting a tactile sense.

BACKGROUND ART

Tactile sense feedback technologies have been proposed that provide a person with information through his/her tactile sense. For example, the touch screen apparatus disclosed in Patent Document 1 controls the time between contact and separation of touch screen and the finger of a user (input means), thereby causing the user to feel textures on the surface such as fine shapes thereon. Specifically, in this apparatus, a person adjusts the time when his/her finger is and is not in contact with the touch screen, thereby variably controlling the frictional force between the touch screen and the finger (see, for example, paragraphs [0028] and [0029] of the specification of Patent Document 1).

CITATION LIST

Patent Document

Patent Document 1: Japanese Patent Application Laid-open No. 2011-159280

SUMMARY

Problem to be Solved

However, since a person needs to accurately place his/her finger on the vibrating touch screen to control the finger contact/non-contact time, that cannot be considered practicable. In particular, the apparatus disclosed in Patent Document 1 uses a piezoelectric actuator as a vibration generating means. In this case, the vibration amplitude is several µm at most, and it is impossible for the person to adjust the time when his/her finger is and is not in contact with the touch screen that vibrates with such amplitude.

It is an object of the present technology to provide a tactile sense presentation apparatus, a signal generation device, a tactile sense presentation system, and a tactile sense presentation method that are capable of presenting a tactile sense with a frictional force without need of finger non-contact time.

Means for Solving the Problem

In order to achieve the above-mentioned object, the tactile sense presentation apparatus according to the present technology includes a movable body, an actuator unit, and a signal generation unit.

The actuator unit is connected to the movable body.

The signal generation unit is configured to supply a driving signal to the actuator unit, the driving signal generating a vibration on the actuator unit, the vibration having within a period at least one of a plurality of different amplitudes and a plurality of different frequencies.

The vibration generated by such an actuator unit vibrates the movable body, which makes it possible to present, to the user, a tactile sense with a frictional force between the movable body and the body (e.g., finger) of the user without the time when the body of the user and the movable body are not in contact with each other.

The signal generation unit may be configured to generate the driving signal such that the actuator unit moves along a first direction under a first frequency and along a second direction opposite to the first direction under a second frequency different from the first frequency. Alternatively, the signal generation unit may be configured to generate the driving signal such that the actuator unit moves along a first direction under a first amplitude and along a second direction opposite to the first direction under a second amplitude different from the first amplitude.

According to the tactile sense presentation apparatus, it is possible to present, to the user, a tactile sense with a variably controlled frictional force according to the first direction and the second direction opposite thereto.

The signal generation unit may be configured to generate the driving signal such that a vibration having an amplitude and a frequency obtained on the basis of a detection threshold value of a tactile receptor is generated on the actuator unit.

The tactile sense presentation apparatus uses a detection threshold value of the tactile receptor as a designing value, which makes it possible to use the amplitude or frequency corresponding to the tactile area and the non-tactile area, and to present various tactile senses to the user.

The signal generation unit may be configured to generate the driving signal such that vibrations including a vibration having a frequency corresponding to a tactile area of the tactile receptor and a vibration having a frequency corresponding to a non-tactile area of the tactile receptor are generated on the actuator unit. Alternatively, the signal generation unit may be configured to generate the driving signal such that vibrations including a vibration having an amplitude corresponding to the tactile area of the tactile receptor and a vibration having an amplitude corresponding to the non-tactile area of the tactile receptor are generated on the actuator unit.

The actuator unit may include at least a first actuator that moves the movable body along a direction of a first axis.

Accordingly, the tactile sense presentation apparatus is capable of presenting, to the user, a tactile sense with the frictional force along the direction of the first axis.

The actuator unit may further include a second actuator that moves the movable body along a direction of a second axis different from the first axis. The signal generation unit may be configured to further supply the driving signal to the second actuator.

Accordingly, the tactile sense presentation apparatus is capable of presenting, to the user, a tactile sense with the frictional force along the first and second axes.

The signal generation unit may be configured to synchronize timing of a peak value of the driving signal supplied to the first actuator with timing of a peak value of the driving signal supplied to the second actuator. Alternatively, the signal generation unit may be configured to displace timing of a peak value of the driving signal supplied to the first actuator from timing of a peak value of the driving signal supplied to the second actuator.

According to the tactile sense presentation apparatus, it is possible to present, to the user, various tactile senses with the frictional force.

The actuator unit may further include a third actuator that moves the movable body along a direction of a third axis different from the first axis and the second axis. The signal generation unit may be configured to further supply the driving signal to the third actuator.

In this case, the signal generation unit may be configured to synchronize timing of a peak value of the driving signal supplied to the first actuator, timing of a peak value of the driving signal supplied to the second actuator, and timing of a peak value of the driving signal supplied to the third actuator with each other. Alternatively, the signal generation unit may be configured to displace timing of a peak value of the driving signal supplied to the first actuator, timing of a peak value of the driving signal supplied to the second actuator, and timing of a peak value of the driving signal supplied to the second actuator from each other.

According to the tactile sense presentation apparatus, it is possible to present, to the user, various tactile senses with the frictional force.

Another tactile sense presentation apparatus according to the present technology includes the movable body, the actuator unit, and a reception unit configured to receive a driving signal generating a vibration on the actuator unit, the vibration having within a period at least one of a plurality of different amplitudes and a plurality of different frequencies.

Another tactile sense presentation apparatus according to the present technology includes a signal generation unit and a transmission unit.

The signal generation unit is configured to generate a driving signal generating a vibration on an actuator unit connected to a movable body of a tactile sense presentation apparatus, the vibration having within a period at least one of a plurality of different amplitudes and a plurality of different frequencies.

The transmission unit is configured to transmit the generated driving signal.

Another signal generation device according to the present technology is configured to supply, to an actuator unit connected to a movable body, a driving signal such that a vibration is generated on the movable body, the vibration providing directionality to a frictional force between the movable body and a target object being in contact with the movable body.

Another tactile sense presentation apparatus according to the present technology includes a movable body, an actuator unit, and a signal generation unit.

The actuator unit is connected to the movable body.

The signal generation unit is configured to supply, to the actuator unit, a driving signal such that a vibration is generated on the movable body, wherein direction of a frictional force between the movable body and a target object that contacts the movable body is variably controlled.

The tactile sense presentation system according to the present technology includes a tactile sense presentation apparatus and a signal generation device.

The tactile sense presentation apparatus includes a movable body, an actuator unit, and a reception unit. The actuator unit is connected to the movable body. The reception unit is configured to receive a signal from outside.

The signal generation device includes a signal generation unit and a transmission unit. The signal generation unit is configured to generate a driving signal such that a vibration is generated on the actuator unit, the vibration having within a period at least one of a plurality of different amplitudes and a plurality of different frequencies.

The transmission unit is configured to transmit the generated driving signal to the tactile sense presentation apparatus.

Accordingly, for example, the signal generation device transmits the driving signal to the tactile sense presentation apparatus via cloud, and the tactile sense presentation apparatus can receive it.

The tactile sense presentation method according to the present technology includes supplying a driving signal to an actuator unit, the driving signal generating a vibration on the actuator unit, the vibration having within a period at least one of a plurality of different amplitudes and a plurality of different frequencies.

The movable body connected to the actuator unit is driven by the actuator unit on the basis of the supplied driving signal.

The tactile sense presentation method according to the present technology includes supplying, to an actuator unit connected to a movable body, a driving signal such that a vibration is generated on the movable body, wherein direction of a frictional force between the movable body and a target object that contacts the movable body is variably controlled.

The movable body is driven by the actuator unit supplied with the driving signal.

Effects

Hereinabove, according to the present technology, it is possible to present a tactile sense with a frictional force without need of finger non-contact time.

It should be noted that effects described herein are not necessarily limited, and may be any of the effects described herein.

BRIEF DESCRIPTION OF DRAWINGS

FIG. 1B A perspective view showing a touch panel and an actuator unit connected thereto.

FIG. 5 A table showing an example of a vibration waveform having the amplitude and frequency areas obtained on the basis of the tactile receptor.

DESCRIPTION OF EMBODIMENTS

Hereinafter, embodiments of the present technology will be described with reference to the drawings.

1. First Embodiment

Figure 1:
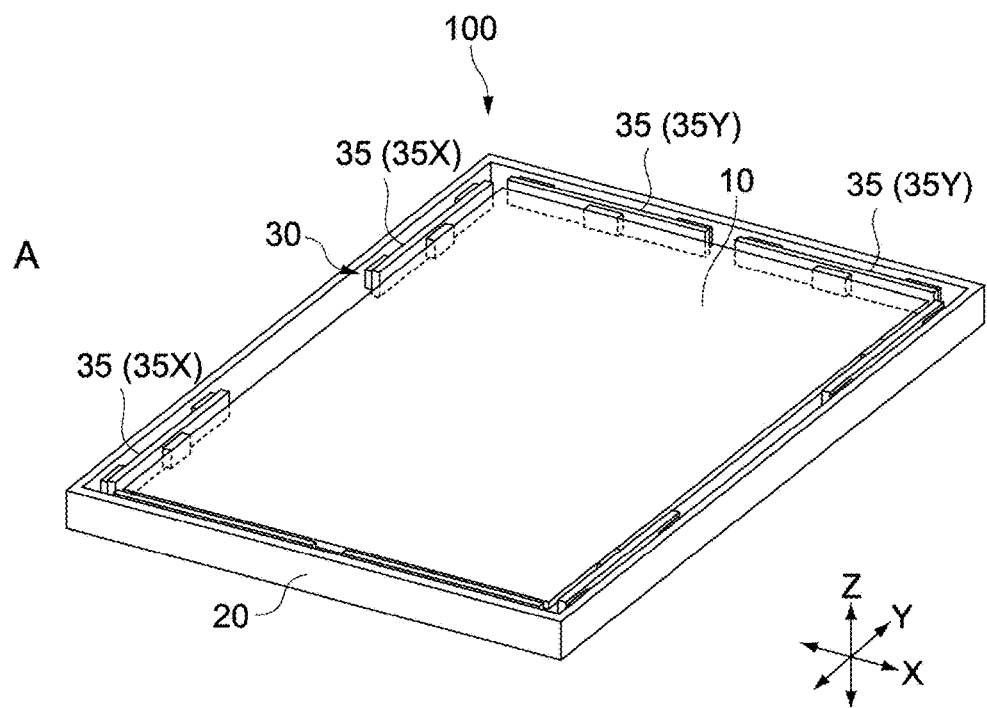
FIG. 1 A perspective view showing an example of the tactile sense presentation apparatus according to a first embodiment.
Figure 1:
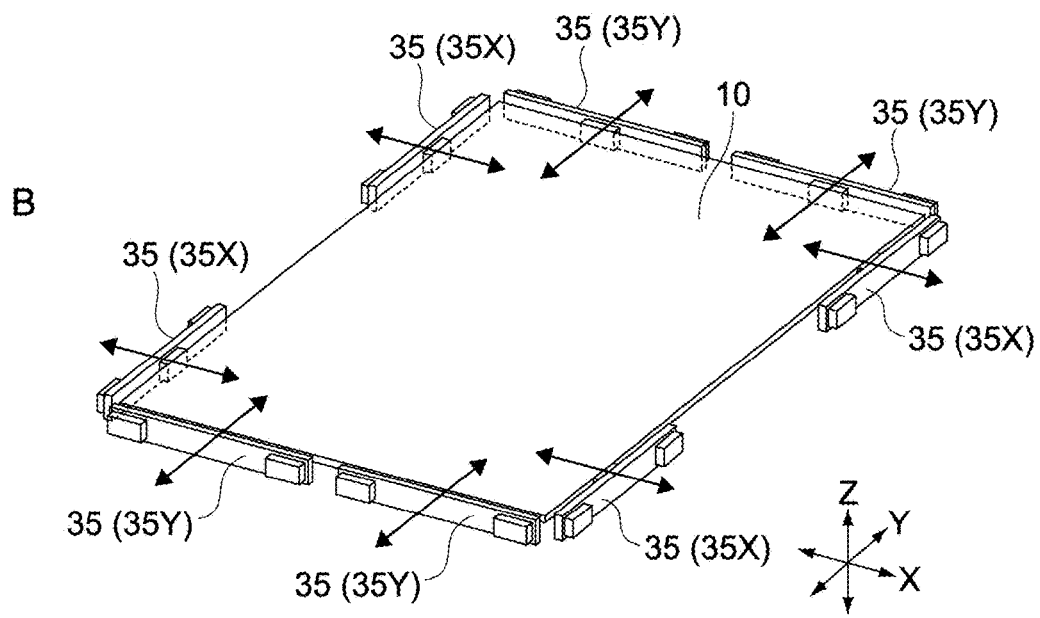

1) Configuration of Tactile Sense Presentation Apparatus 1-1) Overall Configuration FIG. 1A is a perspective view showing an example of a tactile sense presentation apparatus 100 according to a first embodiment.

The tactile sense presentation apparatus 100 includes a touch panel (touch sensor) 10 serving as, for example, a movable body, and an actuator unit 30 connected to the touch panel 10. The touch panel 10 may be integrally formed with a display panel, for example. It should be noted that hereinafter, a panel obtained by integrating the touch panel 10 with the display panel is called as a panel unit in some cases. Moreover, the tactile sense presentation apparatus 100 includes a signal generation unit (signal generation device) 60 that supplies a driving signal to the actuator unit 30 as will be described later. It should be noted that the actuator unit 30 is supported by a supporting body 20 such as an enclosure or a frame.

Typical examples of the tactile sense presentation apparatus 100 include a portable device such as a mobile phone and a tablet.

1-2) Actuator Unit

FIG. 1B is a perspective view showing the touch panel 10 and the actuator unit 30 connected thereto.

The actuator unit 30 includes a plurality of X actuators 35X and a plurality of Y actuators 35Y. The plurality of X actuators 35X and the plurality of Y actuators 35Y have the same configuration. Therefore, in the following description, an arbitrary actuator out of the actuators 35X and the actuators 35Y is represented simply as "actuator." The same shall apply to a Z actuator to be described later.

Figure 2:
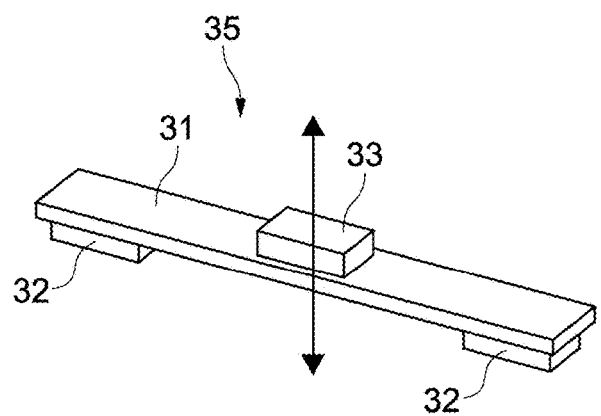
FIG. 2 A perspective view showing a configurational example of the actuator.

FIG. 2 is a perspective view showing a configurational example of the actuator 35. The actuator 35 according to this example is a piezoelectric device, for example. The actuator 35 includes, for example, a plate-like piezoelectric element 31, and connection portions 32 and a connection portion 33 fixed to the piezoelectric element 31. The connection portions 32 are provided at the both end portions of the piezoelectric element 31, for example, and are fixed to the supporting body 20 (see FIG. 1A). The connection portion 33 is provided to the center portion of the piezoelectric element 31, for example, and is connected to the touch panel 10. To the piezoelectric element 31, an input terminal for an electric signal (not shown) is provided, and a driving signal to be described later is input. Accordingly, the actuator 35 is capable of vibrating upward and downward in the figure with the connection portions 32 as a node and the connection portion 33 as an anti-node.

It should be noted that the above-mentioned configuration of the actuator 35 is only an example, and devices that use the piezoelectric element 31 and have various shapes, sizes, and structures can be applied to the actuator 35.

As shown in FIG. 1B, (the connection portions 33 of) the actuators 35 are connected to the four sides of the touch panel 10 having a rectangular shape. For example, the number of actuators 35 connected to one side is two. In the following description, the assumption is made that the axis along the short side of the touch panel 10 is an X axis and the axis along the long side is a Y axis perpendicular to the X axis in the figure, for illustrative purposes.

The tactile sense presentation apparatus 100 configured as described above is capable of vibrating the touch panel 10 in both axial directions of the X axial direction and the Y axial direction, i.e., in an arbitrary direction in a two dimension being an X-Y plane, in the enclosure.

1-3) Signal Generation Unit

Figure 3:
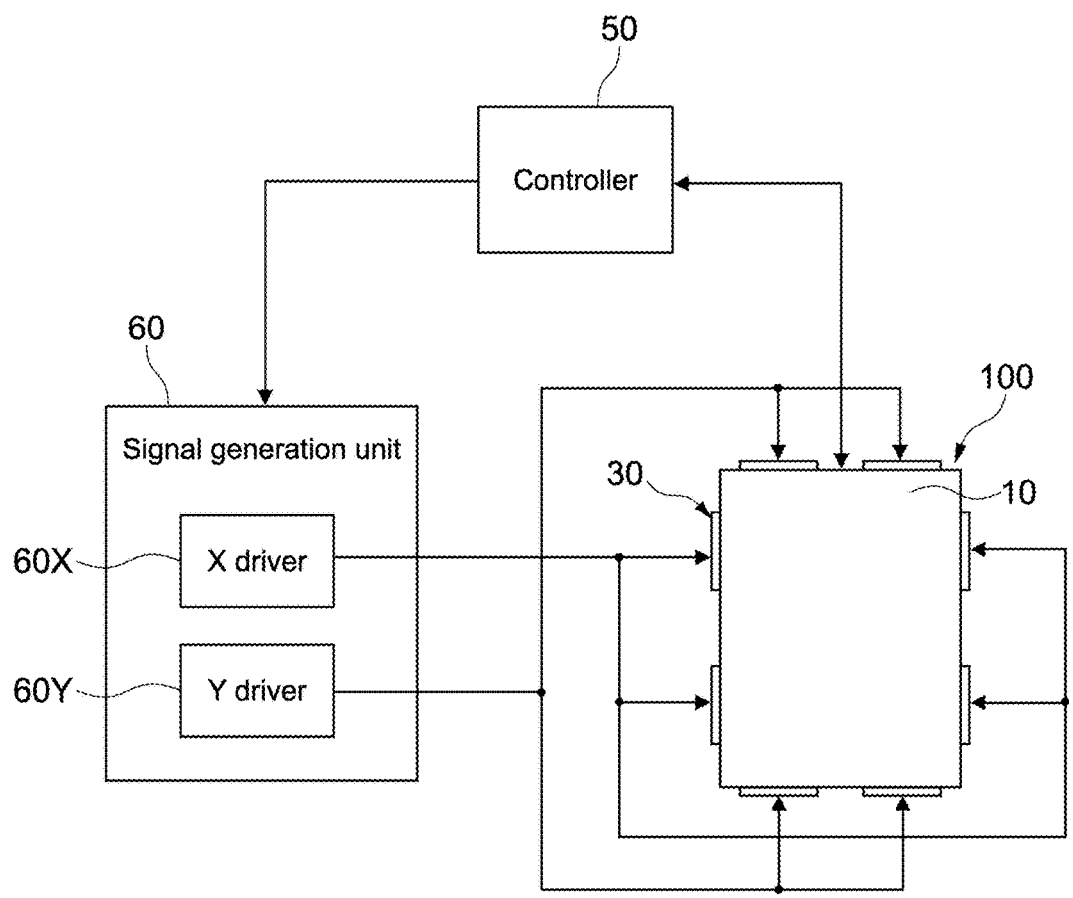
FIG. 3 A block diagram showing mainly an electrical configuration of the tactile sense presentation apparatus including the signal generation unit.

FIG. 3 is a block diagram showing an electrical configuration of the tactile sense presentation apparatus 100 including the above-mentioned signal generation unit 60.

The tactile sense presentation apparatus 100 includes a controller 50 and the signal generation unit 60. The controller 50 is configured to transmit a control signal to the signal generation unit 60 on the basis of the information on a user's operation input from the touch panel 10, for example. The controller 50 includes hardware such as a CPU (Central Processing Unit), a RAM (Random Access Memory), and a ROM (Read Only Memory), and stores software necessary for the ROM. The controller 50 may include a PLD (Programmable Logic Device) instead of the CPU.

The signal generation unit 60 includes an X driver 60X and a Y driver 60Y. The X driver 60X supplies the X actuators 35X with the driving signal for driving (vibrating) the X actuators 35X in synchronization with each other. The Y driver 60Y supplies the Y actuators 35Y with the driving signal for driving (vibrating) the Y actuators 35Y in synchronization with each other. By such a configuration of the signal generation unit 60, it is possible to supply the driving signal to the actuator unit 30 according to the control signal from the controller 50 and to vibrate the touch panel 10 in an arbitrary direction in the X-Y plane.

The information on a user's operation received by the controller 50 is information on the contact position of a target object such as the body (e.g., finger) of the user on the touch panel 10, for example. If the user moves his/her finger on the touch panel 10, the controller 50 receives data on the contact position one after another and thus is capable of detecting the direction of the movement of the contact position at any time. The controller 50 outputs the control signal on the basis of the direction of the movement, thereby driving the actuator 35 via the signal generation unit.

Figure 4:
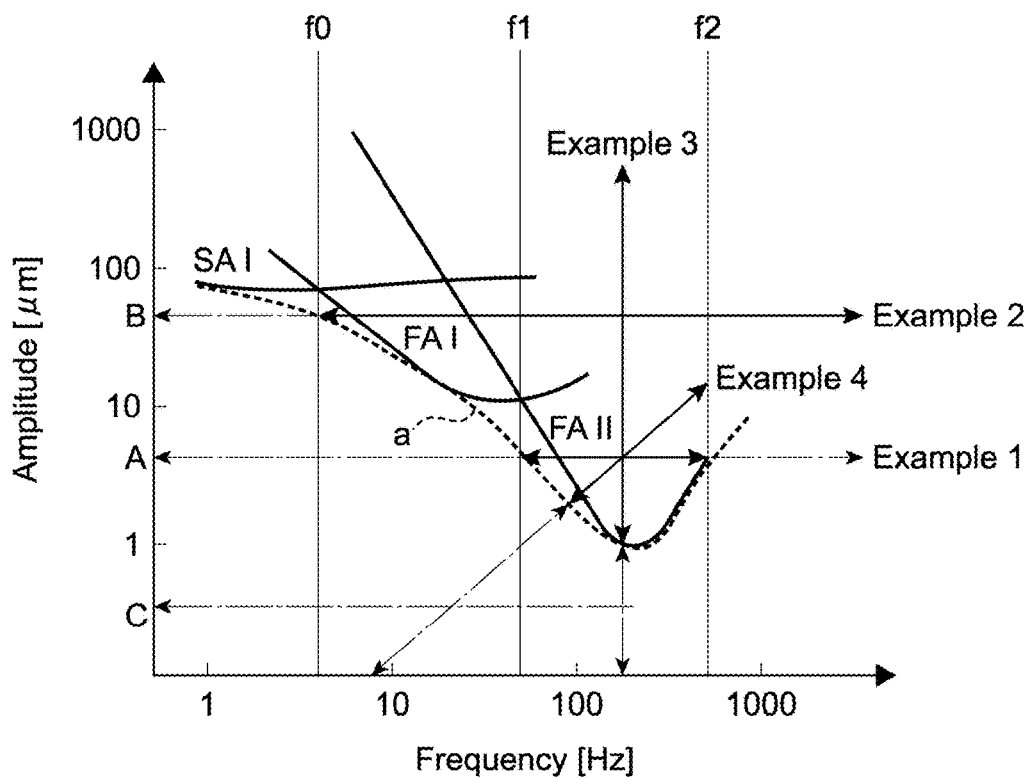
FIG. 4 A graph showing a detection threshold value of tactile receptors of persons against vibration.

As described above, by using a piezoelectric device as the actuator 35, it is possible to increase the response speed by the actuator unit 30 as compared with a device using an eccentric motor, a linear motor, or the like. It is possible to achieve not more than 5 ms of the response speed of the piezoelectric device 2) Vibration Waveform 2-1) Detection Threshold Value of Tactile Receptor FIG. 4 is a graph showing a detection threshold value of a plurality of types of tactile receptors of persons against vibration, for example. The horizontal axis represents the frequency (Hz), and the vertical axis ($\mu$m) represents the amplitude. Examples of the types of tactile receptors of persons include SA I, FA I, and FA II. Specifically, it is generally known that there are an amplitude area and a frequency area for each type of the tactile receptors, which can be detected or cannot be detected by persons.

The assumption is made that an envelope a (represented by dashed line) of these types of threshold values is the detection threshold value herein. The area on or above the envelope is an area in which persons can perform detection, i.e., the tactile area. On the other hand, the area less than the envelope a (area below the envelope a) is an area in which persons cannot perform detection, i.e., the non-tactile area. According to the present technology, by applying such a detection threshold value of the tactile receptor, for example, it is possible to present various tactile senses to the user.

Specifically, the tactile sense presentation apparatus 100 generates a special vibration waveform that allows the amplitude area of a non-tactile sense to a tactile sense or the frequency area of a non-tactile sense to a tactile sense to coexist within a period of vibration, and generates a frictional force between the touch panel 10 and the finger, as a main embodiment.

2-2) Example of Vibration Waveform

FIG. 5 is a table showing an example of a vibration waveform having the amplitude and frequency areas obtained on the basis of this tactile receptor. These examples 1 to 4 each show that the one period has two kinds of vibration waveforms 1 and 2. Frequencies f0, f1, and f2 and amplitudes A, B, and C shown in FIG. 5 correspond to those shown in the graph representing the detection threshold value of the tactile receptor shown in FIG. 4. The content of the tables is shown as follows.

Example 1

Waveform 1 (tactile area): Amplitude A, Frequency $f1 < f < f2$
Waveform 2 (non-tactile area): Amplitude A, Frequency $f < f1$ or $f2 < f$ Example 2

Waveform 1 (tactile area): Amplitude B, Frequency $f0 < f$
Waveform 2 (non-tactile area): Amplitude B, Frequency $f < f0$ Example 3

Waveform 1 (tactile area): Amplitude A, Frequency f1<f<f2
Waveform 2 (non-tactile area): Amplitude C, Frequency f1<f<f2

Example 4

Waveform 1 (tactile area): Amplitude A, Frequency f1<f<f2
Waveform 2 (non-tactile area): Amplitude C, Frequency f<f1

Specifically, these vibrations each include at least one of a plurality of different amplitudes (a first amplitude and a second amplitude) and a plurality of different frequencies (a first frequency and a second frequency) within a period.

In the present technology, the above-mentioned vibrations of the tactile area and the non-tactile area only have to coexist within a period of a vibration, and the combination of the frequencies and the amplitudes is not limited.

As long as it follows the detection threshold value of the tactile receptor, it is possible to generate an effective frictional force that can be sufficiently felt by persons by using relatively high frequencies between 100 Hz to 200 Hz, for example, even if a small amplitude area (e.g., A) is used.

2-2-1) Embodiment Using Vibration Waveform According to [Example 1]

Figure 6:
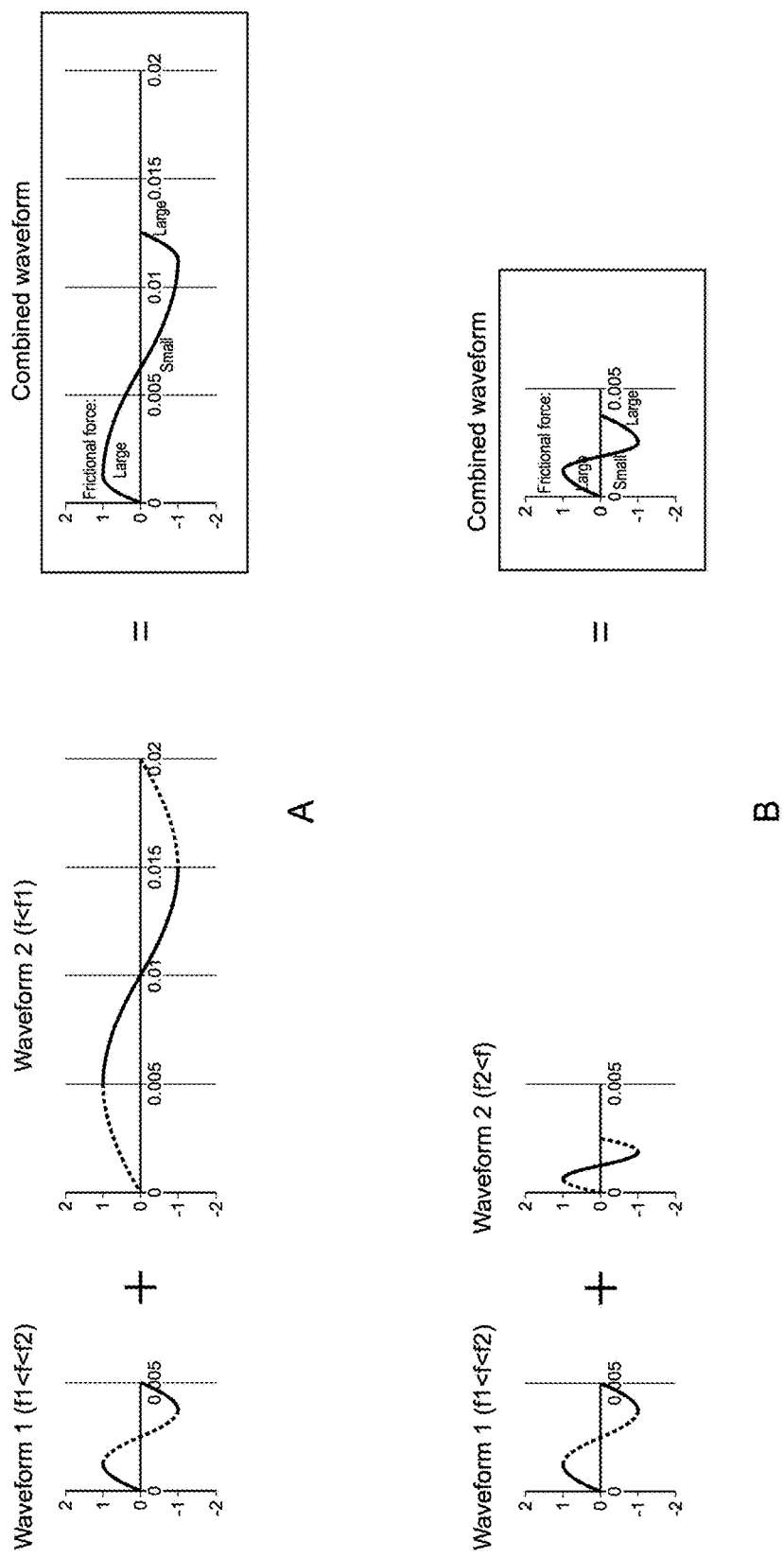
FIG. 6A A diagram showing vibration waveform corresponding to an example 1 of the table of FIG. 5.
FIG. 6B A diagram showing vibration waveform corresponding to the example 1 of the table of FIG. 5.

FIGS. 6A and 6B each show a vibration waveform corresponding to the above-mentioned example 1. Values of the vertical axis (amplitude) and the horizontal axis (time) are normalized. FIG. 6A corresponds to the frequency f<f1 regarding the waveform 2, and FIG. 6B corresponds to the frequency f2<f regarding the waveform 2. As an example, it is possible to set A≈5 um and f≈200 Hz as the waveform 1. Portions of the waveforms 1 and 2, which are represented by solid lines, are combined, thereby obtaining a vibration waveform shown by the "combined waveform."

Figure 7:
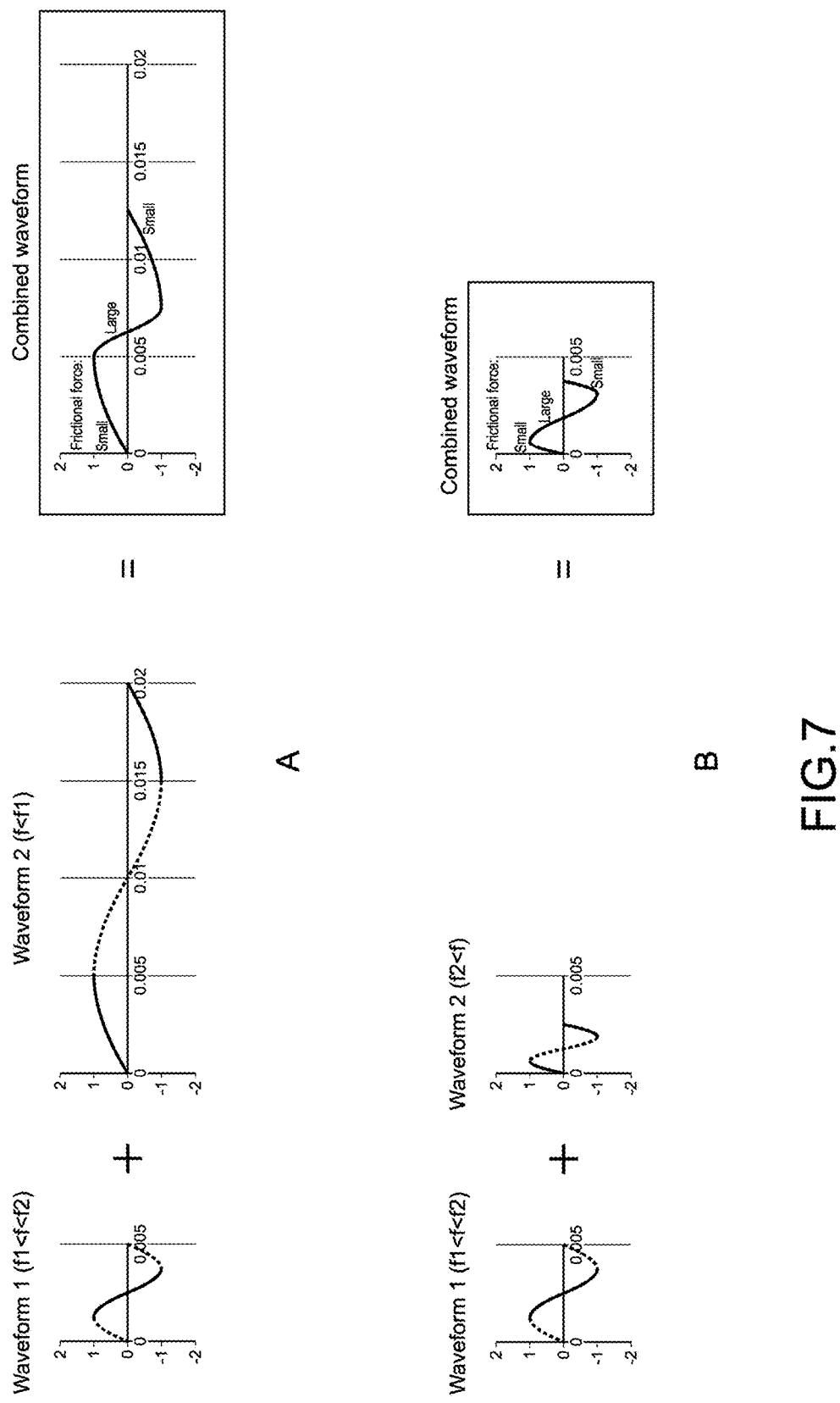
FIG. 7A A diagram showing another example of a vibration waveform corresponding to the example 1.
FIG. 7B A diagram showing another example of a vibration waveform corresponding to the example 1.

The signal generation unit 60 supplies the driving signal to the actuator unit 30 to vibrate the actuator unit 30 (and the touch panel 10) like this. The waveform of the electric signal output from the signal generation unit 60 is substantially similar to the combined waveform shown in FIGS. 6A and 6B. In this case, the vibration amplitude and the voltage match. Now, for illustrative purposes, a vibration waveform in one axial direction of any of the X actuators 35X and the Y actuators 35Y will be described. The same shall apply to waveforms shown in FIGS. 7A and 7B.

In readdress to the waveforms shown in FIGS. 6A and 6B, the solid line part and the dashed line part of the waveform 1 and the waveform 2 are separated on the basis of the forward path and the return path of the vibration in one axial direction, for example. Specifically, the solid line part of the waveform 1 is set as the forward path (direction in which the graph increases in a positive direction), and the solid line part of the waveform 2 is set as the return path (direction in which the graph increases in a negative direction).

Figure 8:
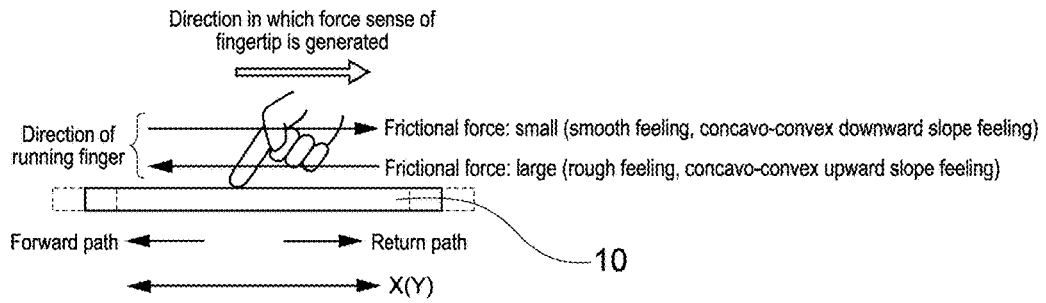
FIG. 8A A diagram schematically showing, for example, the direction in which a frictional force or a force sense of a fingertip is generated.
FIG. 8B A diagram schematically showing, for example, the direction in which a frictional force or a force sense of a fingertip is generated.
Figure 8:
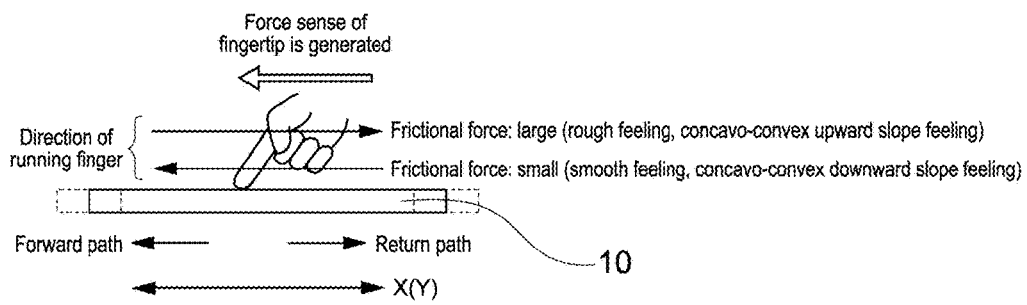

In the combined waveforms shown in FIGS. 6A and 6B, the magnitude of the frictional force is different for the direction of the movement of the finger on the touch panel 10. Here, because the user feels the vibration amplitude in the direction of the forward path as described above, if the user moves his/her finger in the direction opposite to the direction of the forward path (i.e., direction of the return path), it appears as a (relatively large) frictional force. On the contrary, if the user moves his/her finger in the direction of the forward path, the frictional force is small. The direction in which a frictional force or a force sense of a fingertip is generated at this time or the like is schematically shown in FIG. 8A. The white arrow represents the direction of the force sense, i.e., directionality of the frictional force is presented. The user virtually feels rough as the feeling of a large frictional force and feels smooth as the feeling of a small frictional force. In addition, according to the vibration waveform, it is possible to present a virtual upward slope feeling or downward slope feeling by increasing or decreasing the frictional force.

FIGS. 7A and 7B each show another example of the vibration waveform corresponding to the above-mentioned example 1. In FIGS. 7A and 7B, the magnitude of the frictional force on the forward path and the return path is opposite to that in FIGS. 6A and 6B. Specifically, the vibration waveform of the non-tactile area of the waveform 2 is used on the forward path, and the vibration waveform of the tactile area of the waveform 1 is used on the return path (see FIG. 8B).

Because the controller 50 is capable of detecting the position of the finger of the user on the touch panel 10 as described above, it is possible to detect the direction of the movement. Therefore, the controller 50 is capable of adaptively switching the driving signal on the basis of the detected direction, thereby presenting a variably controlled frictional force according to the direction of the movement of the finger.

Moreover, the actuator unit 30 according to this embodiment includes the X actuators 35X and the Y actuators 35Y. Therefore, the X driver 60X and the Y driver 60Y can cooperate with each other to generate respective driving signals, thereby presenting, to the user, a variably controlled frictional force according to the movement of the finger in an arbitrary direction in the X-Y plane.

In the above, only the vibration waveform according to the example 1 has been described. However, it goes without saying that the tactile sense presentation apparatus 100 is capable of presenting, to the user, various frictional forces by using the vibration waveforms (=driving signals) according to the examples 2 to 4.

2-2-2) Embodiment Using Parabolic Vibration Waveform

Figure 9:
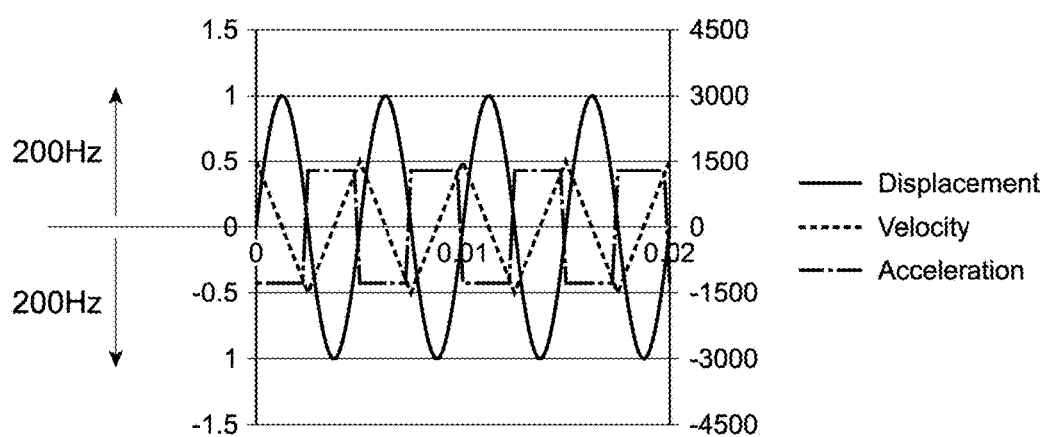
FIG. 9 A diagram showing an example of a parabolic vibration waveform (no acceleration directionality).
Figure 10:
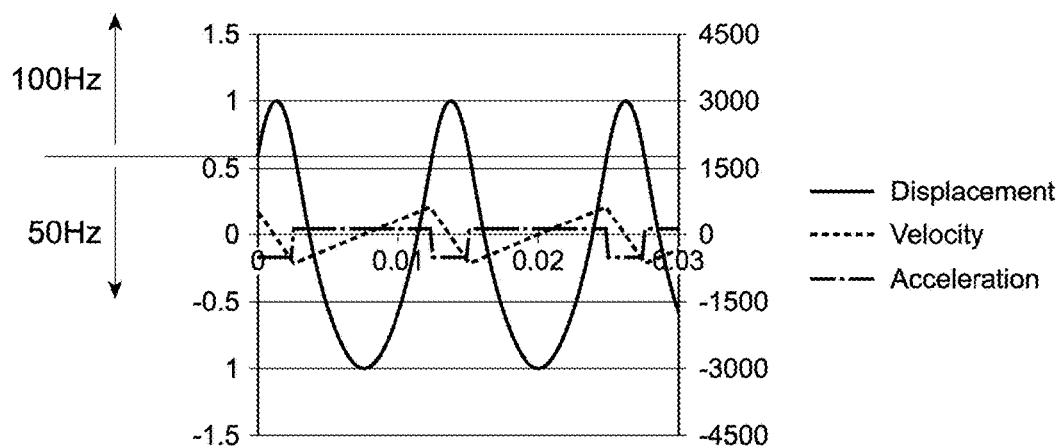
FIG. 10 A diagram showing an example of a parabolic vibration waveform (small force sense).
Figure 11:
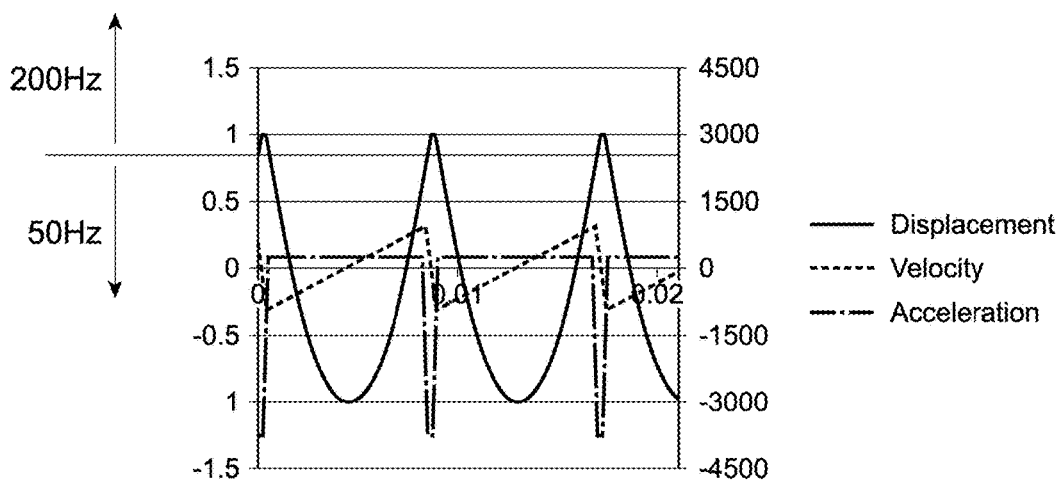
FIG. 11 A diagram showing an example of a parabolic vibration waveform (large force sense).

The next technique tries to present a clearer force sense by using not only the detection threshold value of the tactile receptor as shown in FIG. 5 but also a parabolic vibration waveform (not sinusoidal). FIGS. 9, 10, and 11 each show an example of the parabolic vibration waveform. The waveform in a half period represents a parabola. The horizontal axis represents time, and the vertical axis represents an amplitude (left side) and velocity (right side). The respective values thereof are normalized.

In these vibration waveforms, the time when the polarity (positive or negative) of the acceleration is switched is defined as a half period. The waveform shown in FIG. 9 has the same period (e.g., about 200 Hz) with respect to the positive and negative values of the amplitude, the acceleration being a second order differential value of the vibration waveform represents a vibration with equal positive and negative values, and thus, no direction feeling of the force sense is presented.

FIG. 10 shows a vibration waveform including different frequencies for a half period. These frequencies are 100 Hz and 50 Hz. It should be noted that the examples of vibration waveforms shown in FIGS. 6 and 7 have different frequencies for the forward path and the return path of the vibration. However, the vibration waveform shown in FIG. 10 (similarly to FIG. 11) has different frequencies for each half period when the polarity of the acceleration is switched as described above. In such a vibration waveform, the acceleration being the second order differential value of the vibration waveform does not have the equal positive and negative values, a force sense is generated on the side in which the absolute value of the acceleration is larger, and thus, the direction feeling thereof, i.e., directionality of the frictional force is presented.

FIG. 11 shows a vibration waveform including different frequencies for each half period. These frequencies are 200 Hz and 50 Hz. Also in this case, the acceleration being the second order differential value of the vibration waveform does not have the equal positive and negative values, a force sense is generated on the side in which the absolute value of the acceleration is larger, a difference between accelerations larger than the difference between the accelerations shown in FIG. 10 is caused, and the direction feeling of a larger force sense, i.e., directionality of the frictional force is presented.

Figure 12:
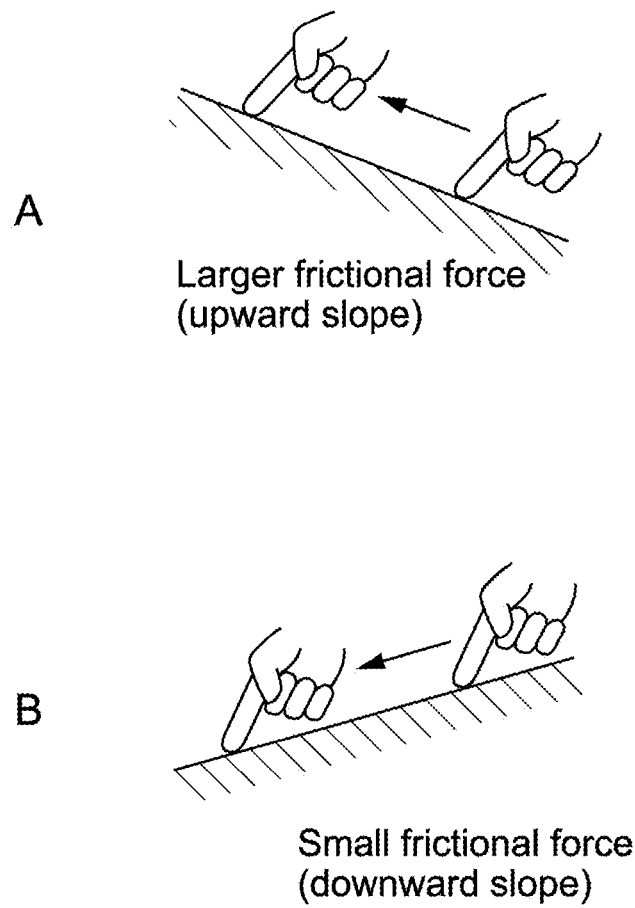
FIG. 12A A diagram schematically showing, for example, the direction in which a frictional force or a force sense of a fingertip is generated.
FIG. 12B A diagram schematically showing, for example, the direction in which a frictional force or a force sense of a fingertip is generated.

As described above, it is possible to apply the detection threshold value of the tactile receptor, allow the frequency area of the non-tactile sense to the tactile sense to coexist within a period of a vibration, and present a larger force sense to the user. Moreover, because it is possible to present, to the user, such a large force sense, it is possible to allow the user to not only feel rough or smooth by the different frictional forces, as shown in FIGS. 8A and 8B, but also feel a slope feeling. For example, in the case where the acceleration works in the direction against the movement of the finger, it presents, to the user, a virtual upward slope feeling as shown in FIG. 12A. On the contrary, in the case where the acceleration works in the direction along the movement of the finger, it presents, to the user, a virtual downward slope feeling as shown in FIG. 12B.

The vibrations shown in FIGS. 10 and 11 can be said to include (two) different frequencies for each half period when the polarity of the acceleration is switched, and a plurality of (two) different amplitudes. These vibrations correspond to the example 4 of the table in FIG. 5.

As described above, also in the embodiment using the parabolic vibration waveform, in the tactile sense presentation apparatus 100, the X driver 60X and the Y driver 60Y can cooperate with each other to generate the respective driving signals, thereby presenting, to the user, a variably controlled frictional force according to the movement of the finger in an arbitrary direction in the X-Y plane.

3) Conclusion

As described above, the tactile sense presentation apparatus 100 according to the first embodiment uses the detection threshold value of the tactile receptor, and generates, on the actuator unit 30, a vibration having at least one of a plurality of different amplitudes and a plurality of different frequencies within a period. Therefore, it is possible to present, to the user, various tactile senses with frictional forces without accurately placing his/her finger on the touch panel 10 and without the time in which the finger and the touch panel 10 are not in contact with each other unlike the related art.

2. Second Embodiment

Next, a tactile sense presentation apparatus 200 according to a second embodiment of the present technology will be described. In the following description, the members, the functions, and the like similar to those of the tactile sense presentation apparatus 100 according to the first embodiment will be denoted by the same reference numerals, a description thereof will be omitted or simplified, and different points will be mainly shown.

1) Configuration of Tactile Sense Presentation Apparatus Including Z Actuator

Figure 13:
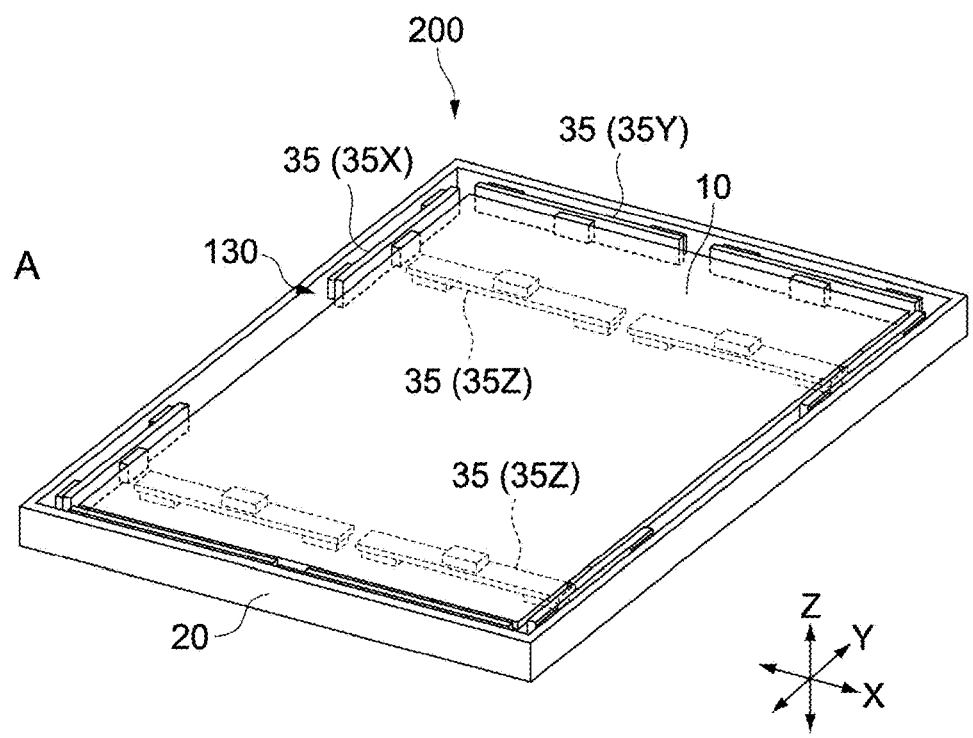
FIG. 13A A perspective view showing the tactile sense presentation apparatus according to a second embodiment.
FIG. 13B A perspective view showing the touch panel and the actuator unit connected thereto.
Figure 13:
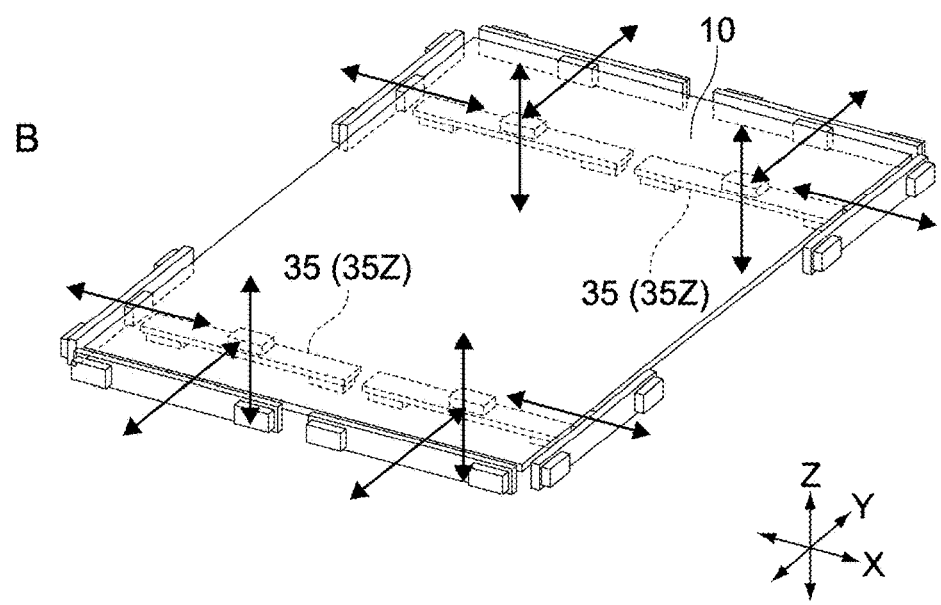

FIG. 13A is a perspective view showing the tactile sense presentation apparatus 200 according to the second embodiment. FIG. 13B is a perspective view showing the touch panel 10 thereof and an actuator unit 130 connected thereto. The actuator unit 130 of the tactile sense presentation apparatus 200 includes Z actuators 35Z as well as the X actuators 35X and the Y actuators 35Y. For example, these four Z actuators 35Z are connected to the side of the back surface of the touch panel 10 (or panel unit), and are configured to be capable of vibrating the touch panel 10 in the direction along the Z axis. Therefore, this tactile sense presentation apparatus 200 is capable of vibrating the touch panel 10 in an arbitrary direction in three dimensions.

The signal generation unit of the tactile sense presentation apparatus 200 includes a Z driver (not shown) that drives the Z actuators 35Z in synchronization with each other, as well as the X driver 60X and the Y driver 60Y.

2) Example of Vibration Waveform (Synchronization)

FIGS. 14A to 14D each show a vibration waveform and a vibration direction obtained by combining vibrations in the two biaxial directions of the X actuators 35X (Y actuators 35Y may be used) and the Z actuators 35Z with each other. The X actuators 35X and the Z actuators 35Z form vibration waveforms in which the phases of positive or negative peak values match, as shown in the figures. Herein, vibrations having the phases of peak values corresponding to each other are referred to as "synchronized" vibrations. By the combination of positive and negative and multiplication of these vibration waveforms, an arbitrary frictional force in an arbitrary direction in the two axes is presented.

In FIGS. 14A to 14D, the Lissajous figure being the bottom view shows a vibration obtained by combining the vibration waveform of the X actuators 35X shown in the top view (hereinafter, referred to simply as "X waveform") and the vibration waveform of the Z actuators 35Z shown in the central view (hereinafter, referred to simply as "Z waveform").

Figure 14:
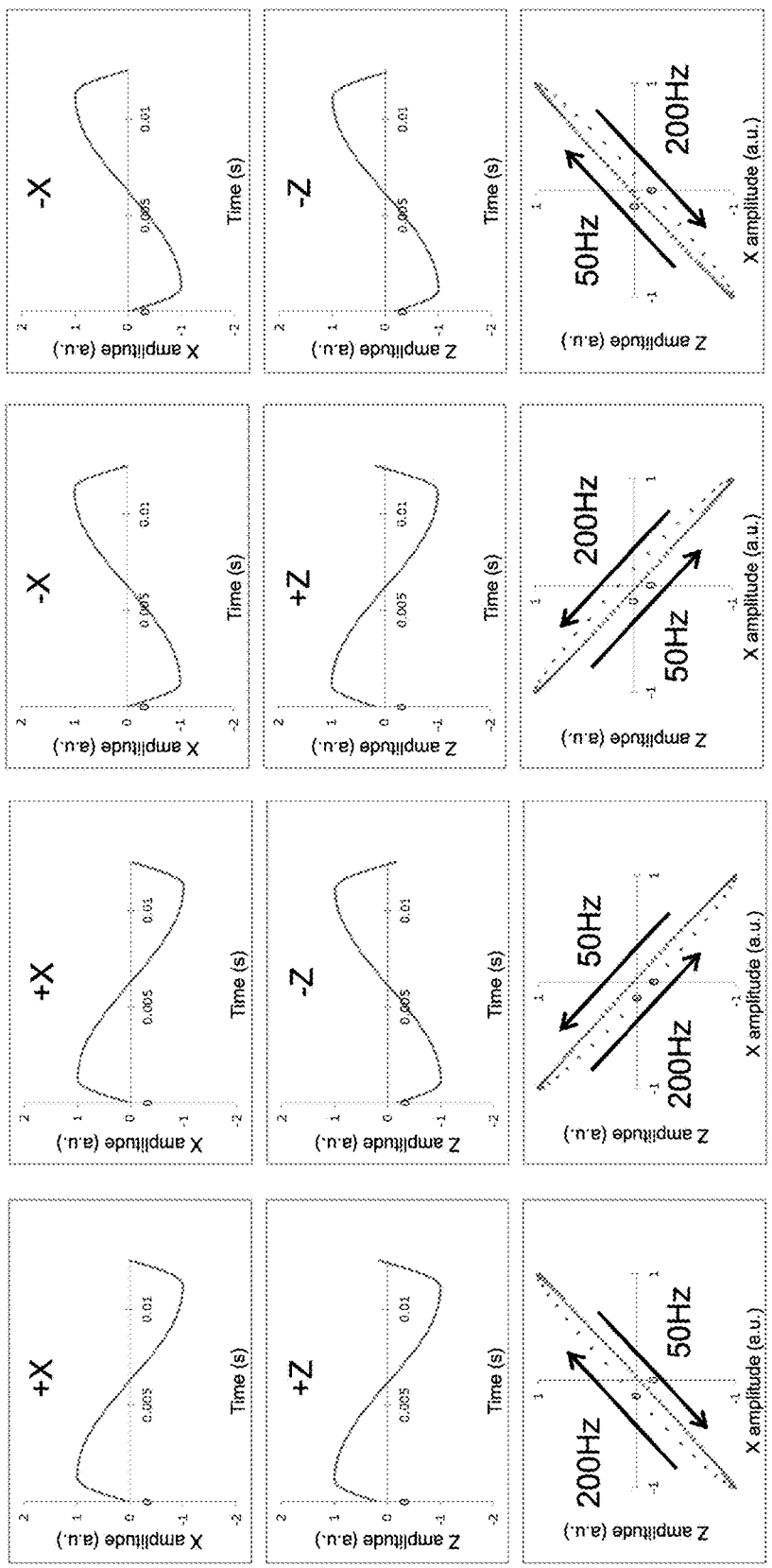
FIG. 14A A diagram showing a vibration waveform and a vibration direction obtained by combining vibrations in the two biaxial directions of an X actuator and a Z actuator with each other (synchronization of peak values).
FIG. 14B A diagram showing a vibration waveform and a vibration direction obtained by combining vibrations in the two biaxial directions of the X actuator and the Z actuator with each other (synchronization of peak values).
FIG. 14C A diagram showing a vibration waveform and a vibration direction obtained by combining vibrations in the two biaxial directions of the X actuator and the Z actuator with each other (synchronization of peak values).
FIG. 14D A diagram showing a vibration waveform and a vibration direction obtained by combining vibrations in the two biaxial directions of the X actuator and the Z actuator with each other (synchronization of peak values).

In FIG. 14A, of the vibration waveforms having amplitudes (peak values of 1) being the X waveform and the Z waveform, the phases of the positive peak values (+1) match and the phases of the negative peak values (−1) match. In this case, as shown in the Lissajous figure, the vibration is one in the upper right lower left direction in the figure, and a tactile sense (200 Hz) is obtained in the upper right direction and no tactile sense (50 Hz) is obtained in the lower left direction.

In FIG. 14B, the phases of the positive peak value (+1) of the X waveform and the negative value (−1) of the Z waveform match. As shown in the Lissajous figure, the vibration is one in the upper left lower right direction in the figure, and a tactile sense (200 Hz) is obtained in the lower right direction and no tactile sense (50 Hz) is obtained in the upper left direction.

In FIG. 14C, the phase of the negative peak value (−1) of the X waveform and the positive value (+1) of the Z waveform match. As shown in the Lissajous figure, the vibration is one in the upper left lower right direction in the figure, and a tactile sense (200 Hz) is obtained in the upper left direction and no tactile sense (50 Hz) is obtained in the lower right direction.

In FIG. 14D, the phases of the negative peak values (−1) match and the phases of the positive peak values (+1) match. As shown in the Lissajous figure, the vibration is one in the upper right lower left direction in the figure, and a tactile sense (200 Hz) is obtained in the lower left direction and no tactile sense (50 Hz) is obtained in the upper right direction.

As described above, by positive and negative amplitudes of the vibration and multiplication of the amplitudes, it is possible to allow the frictional force to have directionality in an arbitrary direction in the X-Z plane. Specifically, it is possible to add an increment and decrement of the vertical drag force with respect to the user's finger.

Figure 15:
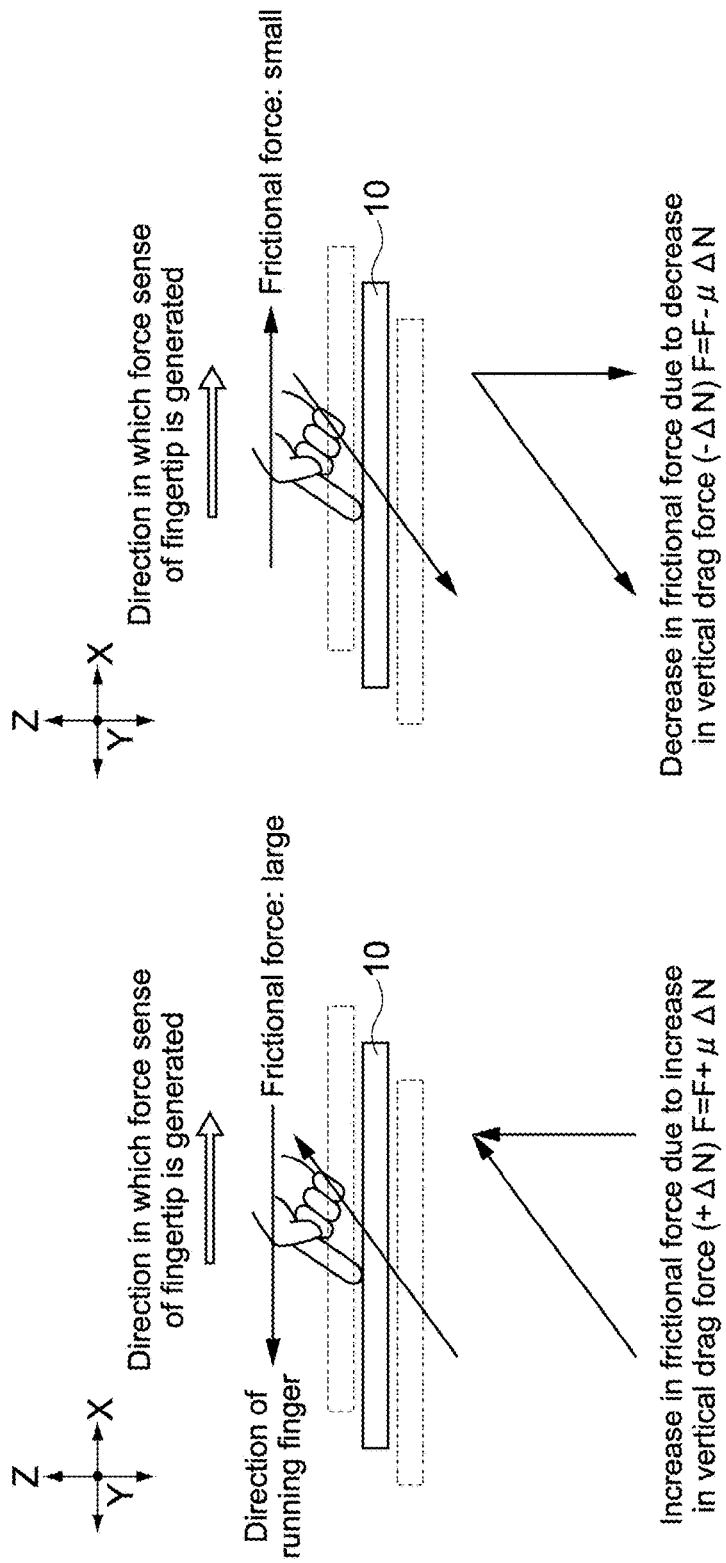
FIG. 15A A diagram schematically showing the state where the frictional force increases and decreased by running a finger on the touch panel by the user in the case where vibration waveforms shown in FIGS. 14A to 14D are used.
FIG. 15B A diagram schematically showing the state where the frictional force increases and decreased by running a finger on the touch panel by the user in the case where vibration waveforms shown in FIGS. 14A to 14D are used.

FIGS. 15A and 15B schematically show the state where the frictional force increases and decreased by running a finger on the touch panel 10 by the user in the case where vibration waveforms shown in FIGS. 14A to 14D are used. FIG. 15A shows the state where the frictional force increases (large), and FIG. 15B shows the state where the frictional force decreases (small). In this case, in the case where the friction coefficient in the X-Y plane is μ and the change amount of the vertical drag force is ΔN, an increase in the frictional force (+μΔN) and a decrease in the frictional force (−μΔN) occur in synchronization with each other.

As described above, by using the vibration of the Z actuators 35Z, it is possible to present, to the user, the difference between frictional forces as a force sense in the X-Y plane which is stronger than that obtained when the parabolic vibration waveform shown in FIGS. 9 to 11 is used, i.e., frictional force having directionality. Accordingly, it is possible to more clearly present, to the user, a virtual upward slope feeling or downward slope feeling in the X-Y plane, for example.

3) Example of Vibration Waveform (Asynchronous)

Next, an example in which the X waveform and the Z waveform are asynchronous vibration will be described. The "asynchronous" herein means the state where the peak values of the X waveform and the Z waveform do not match.

Figure 16:
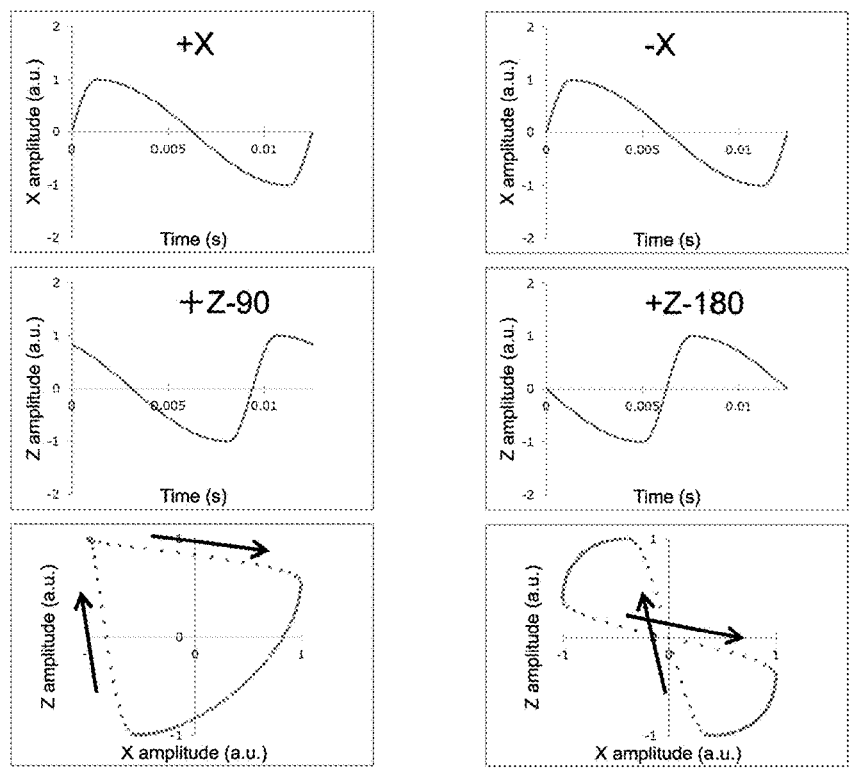
FIG. 16A A diagram showing a vibration waveform and a vibration direction obtained by combining vibrations in the two biaxial directions of the X actuator and the Z actuator with each other (non-synchronization of peak values).
FIG. 16B A diagram showing a vibration waveform and a vibration direction obtained by combining vibrations in the two biaxial directions of the X actuator and the Z actuator with each other (non-synchronization of peak values).

In FIG. 16A, the amplitude of the X waveform and the amplitude of the Z waveform are 1, and phases of the waveforms are displaced by 90 degrees. As shown in the lower Lissajous figure, the vibration direction has no linearity in the X-Z plane, and has an approximately triangular shape.

In FIG. 16B, the amplitude of the X waveform and the amplitude of the Z waveform are 1, and phases of the waveforms are displaced by 180 degrees. As shown in the Lissajous figure, the vibration direction has no linearity in the X-Z plane, and has approximately the shape of numeral "8".

In these cases, directionality of the frictional force presentation is more complex, and therefore, it is possible to present, to the user, various tactile senses as necessary.

3. Third Embodiment

In the above-mentioned first and second embodiments, it has been described that with a running-finger operation, by presenting a virtual upward slope when the frictional force increases and presenting a virtual downward slope when the frictional force decreases, it is possible to present a tactile sense of the three-dimensional shape such as a concavity and convexity even with a running-finger operation on a plane. It should be noted that the strength of the slope (tilt of the slope) can be achieved by (a) gradually changing the vibration amplitude or (b) adjusting the interval in which the vibration is generated.

Regarding the above-mentioned (a), in the case where the vibration amplitude is constant, an edge feeling is presented, and thus, a stronger slope feeling is obtained. On the other hand, a smooth upward slope and a smooth downward slope are presented by gradually increasing the vibration amplitude and gradually decreasing the vibration amplitude, respectively.

Regarding the above-mentioned (b), it is possible to weaken the slope (decrease the tilt) as the time interval between vibrations increases.

4. Another Embodiment of Actuator Unit

Figure 17:
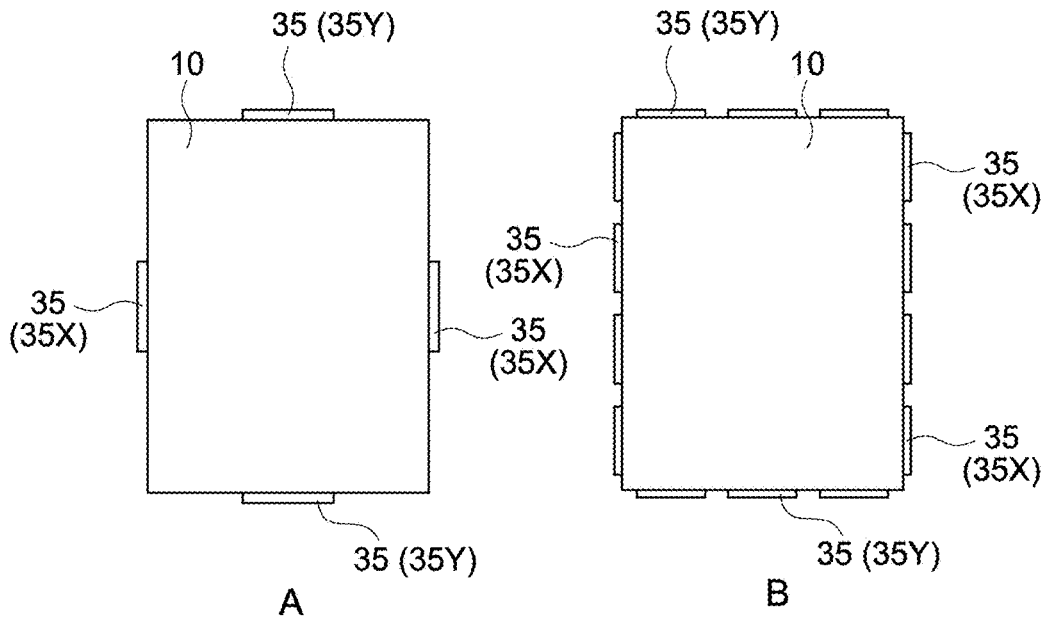
FIG. 17A A diagram showing an actuator unit according to another embodiment.
FIG. 17B A diagram showing an actuator unit according to another embodiment.

In the above-mentioned embodiments, the number of actuators connected to one side of the touch panel 10 is two. The number may be, however, one or three or more. FIG. 17A shows an embodiment in which one actuator 35 is provided on one side, for example. FIG. 17B shows an embodiment in which three actuators 35 are provided on a side along the X axis, and four actuators 35 are provided on a side along the Y axis, for example. As described above, the number of actuators to be connected may be appropriately changed according to the length of the side or the weight of the touch panel 10 (or panel unit). Moreover, it is possible to appropriately change the arrangement of the actuators 35 according to them. In the case where a unique resonance vibration of the touch panel is used, the number of vibration generation devices may be small even if the weight of the touch panel increases.

The actuator units according to FIGS. 18A to 18D each have at least a pair of the actuator 35 and an elastic member 37 on facing sides of the touch panel 10. The actuators 35 and the elastic member 37 hold the touch panel 10 (or panel unit) vibratably, and the elastic member 37 is elastically deformed according to the vibration of the actuator 35. The elastic member 37 is, for example, rubber or a spring.

Figure 18:
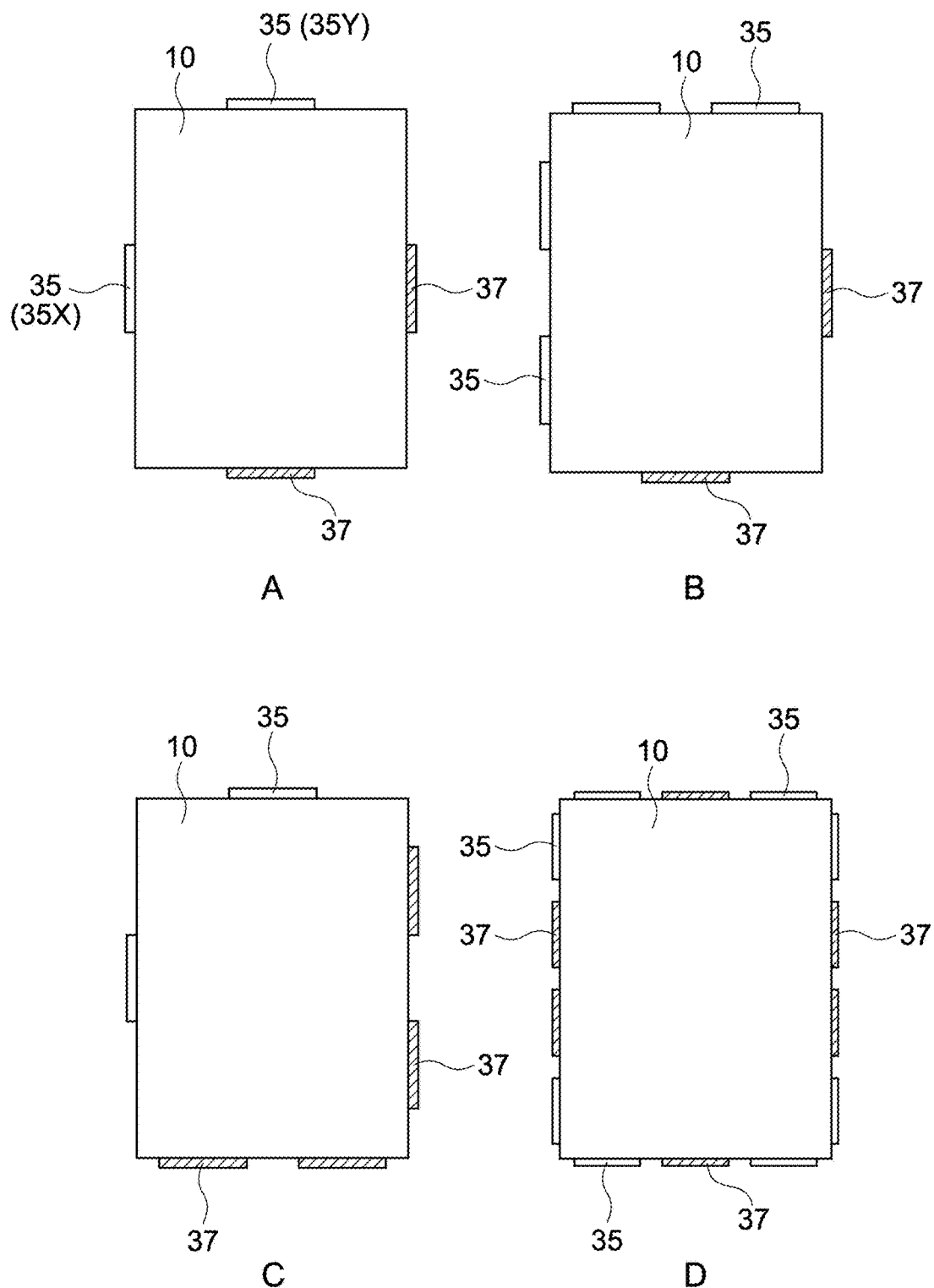
FIG. 18A A diagram showing an actuator unit according to still another embodiment.
FIG. 18B A diagram showing an actuator unit according to still another embodiment.
FIG. 18C A diagram showing an actuator unit according to still another embodiment.
FIG. 18D A diagram showing an actuator unit according to still another embodiment.

In the example shown in FIG. 18A, the minimum configuration of the actuator 35 and the elastic member 37 are shown. Specifically, one actuator 35 and one elastic member 37 are provided on a pair of facing sides.

In the example shown in FIG. 18B, a plurality of (e.g., two) actuators 35 are provided on one side and one elastic member 37 is provided on the side opposite to the one side.

In the example shown in FIG. 18C, one actuator 35 is provided on one side and a plurality of (e.g., two) elastic members 37 are provided on the side opposite to the one side.

In the example shown in FIG. 18D, a plurality of actuators 35 and a plurality of elastic members 37 are provided on each side.

As described above, the arrangement, size, number and the like of the actuator 35 and the elastic member 37 are not limited. They may be any arrangement, size, or number as long as a frequency and a vibration amplitude necessary to move the touch panel 10 can be generated.

Figure 19:
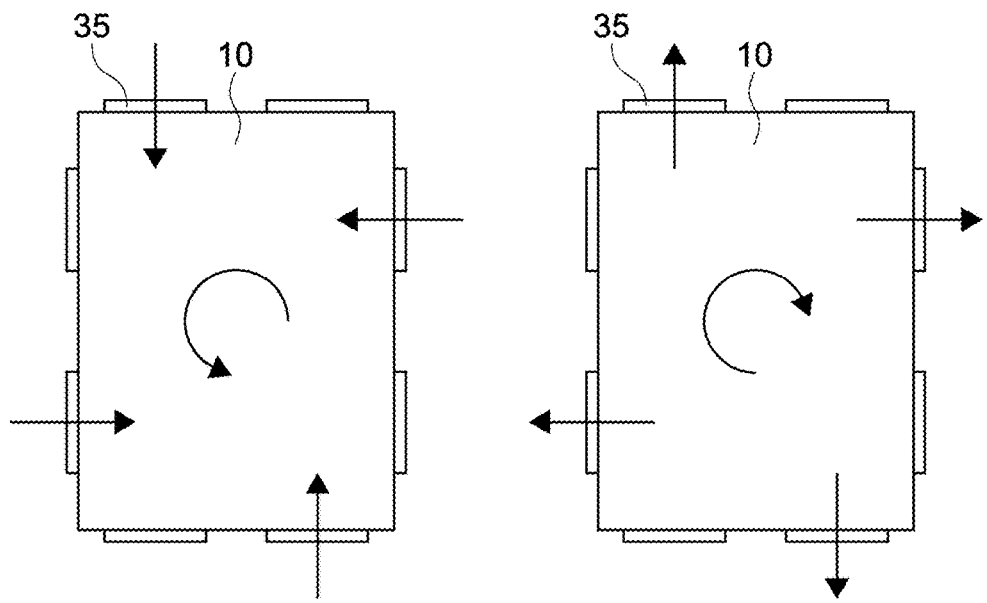
FIG. 19 A diagram showing another operational example of the actuator unit.

In the above description, the vibration of the translational motion of the touch panel 10 has been shown. However, as shown in FIG. 19, for example, the tactile sense presentation apparatus 100 is capable of generating a vibration in rotation directions, by selectively driving at least one actuator 35 of the plurality of actuators 35 provided on one side. Accordingly, it is possible to present various tactile senses.

5. Method of Detecting Vibration Waveform According to Present Technology (Verifying Method)

The specific vibration waveform described above according to the present technology can be detected and verified from outside by measurement using a laser displacement meter, an accelerometer, and the like. The displacement and the acceleration have a relationship between a second-order differential and a second-order integral, and it is possible to detect the vibration waveform from outside on the basis of the measurement values thereof.

6. Other Various Embodiments

The present technology is not limited to the above-mentioned embodiments, and other various embodiments can be achieved.

In the above description, the embodiment in which the present technology is applied to a device including a touch panel has been shown. However, the present technology is not limited thereto, and can be applied to any interface between a human and an object. It is also possible to present a rough touch feeling or a smooth touch feeling when a human touches a supporting body (enclosure or frame) supporting a movable body being the interface, or to allow the supporting body itself to have virtual texture. Moreover, the surface of the movable body is not limited to a flat surface, and may be a curved surface.

These interfaces not only establish a one-to-one relationship between a human and an object, but also establish even a one-to-many or many-to-many relationship. It is conceivable that a vibration waveform that gives a tactile sense felt by someone is transmitted, via cloud (network such as the Internet), to one person or to many persons simultaneously. It is assumed to be used to transmit artist's breath, heartbeat, or the like to the audience to enhance realistic feeling.

Figure 20:
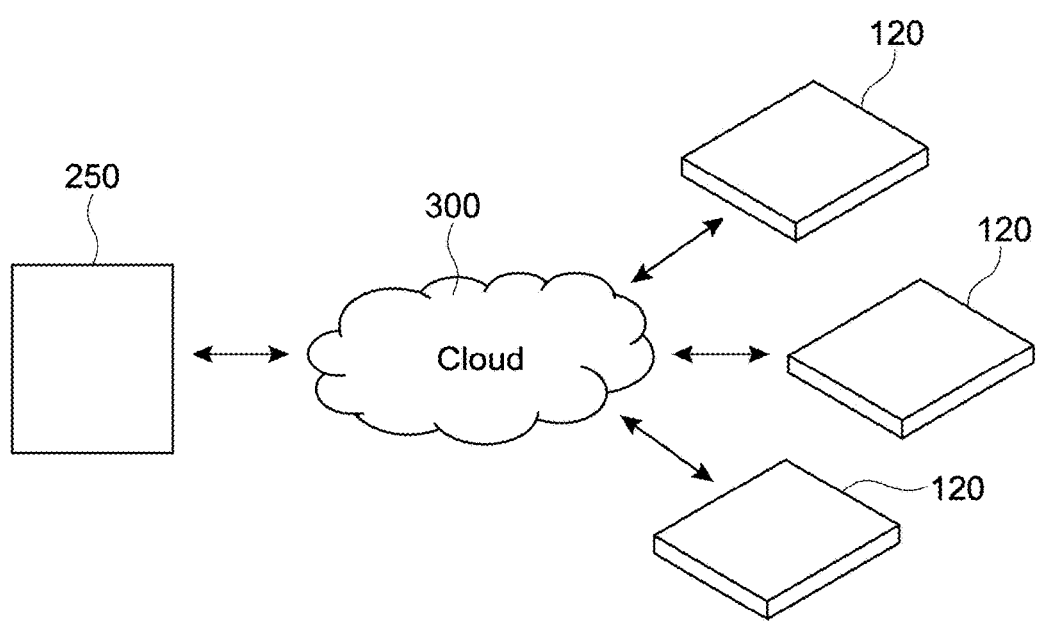
FIG. 20 A diagram showing the configuration of the tactile sense presentation system (transmission and reception to/from the tactile sense presentation apparatus).

FIG. 20 shows the configuration of such a tactile sense presentation system. A signal generation device 250 includes the above-mentioned signal generation unit and transmits (transmission unit) the driving signal of the signal generation unit via a cloud 300, and an apparatus 120 including the actuator unit 30 or 130 receives (reception unit) this and drives the actuator unit 30 or 130. According to the present technology, it is possible to provide such a tactile sense presentation system.

The actuator 35 is not limited to a piezoelectric device, and may be a linear motor such as a voice coil or a device using an eccentric motor or the like, which rotates an eccentric shaft to obtain a vibration.

In the above-mentioned embodiments, a detection threshold value of a tactile receptor has been used. However, the scope of the present technology includes an embodiment that does not use this.

The vibration generated by the tactile sense presentation apparatus 100 or 200 according to the above-mentioned embodiments is one including at least one of two amplitudes and two frequencies within a period. However, the tactile sense presentation apparatus may generate a vibration having at least one of three or more amplitudes and three or more frequencies within a period.

In the above-mentioned embodiments, the actuator unit 30 or 130 includes an actuator capable of vibrating in the directions along two axes perpendicular to each other or three axes perpendicular to each other. However, at least the angle between the two axes may be set to an angle other than the right angle.

7. Detection of Position of Target Object by Actuator Unit

The actuator unit can be used as an acceleration sensor, i.e., a force sensor, because it uses a piezoelectric device. Specifically, the display panel to which the actuator unit is attached functions also as a touch sensor. The piezoelectric sensor is generally capable of successively outputting a detection value by µs. Therefore, the piezoelectric device is capable of switching between the driving of the display panel and the detection of the position of a finger on the touch panel (touch sensor) 10 at a speed in units of µs. Specifically, the user recognizes that the tactile sense presentation apparatus simultaneously achieves both.

In the case where the position of a finger is detected by a piezoelectric device of the actuator unit, the plurality of Z actuators 35Z shown in FIGS. 13A and 13B are necessary. In the case where the one-dimensional contact position on the touch panel is detected, at least two Z actuators 35Z are necessary. In the case where the entire screen of the touch panel, i.e., the two-dimensional contact position is detected, at least three Z actuators 35Z that are not located on a straight line are necessary.

For example, the tactile sense presentation apparatus only has to include a look-up table that associates the ratio of output values of the plurality of Z actuators 35Z with information on the position of a finger on the touch panel. Accordingly, the controller (e.g., controller 50 shown in FIG. 3) is capable of detecting the position of the finger by referring to the look-up table.

For example, a display panel (not shown) is mounted on such a touch sensor. Typically, because it is possible to mount the actuator unit immediately below the display panel, it is unnecessary to provide an electrostatic touch sensor panel or the like on the display panel unlike the conventional technique, for example. Therefore, the transmittance of light generated by the display panel is improved, as compared with the conventional display device including an electrostatic touch sensor panel. Therefore, in the case where the same illuminance of the display panel is maintained, it is possible to reduce power consumption.

8. Another Application Example of Tactile Sense Presentation Apparatus

Application Example 1

Figure 21:
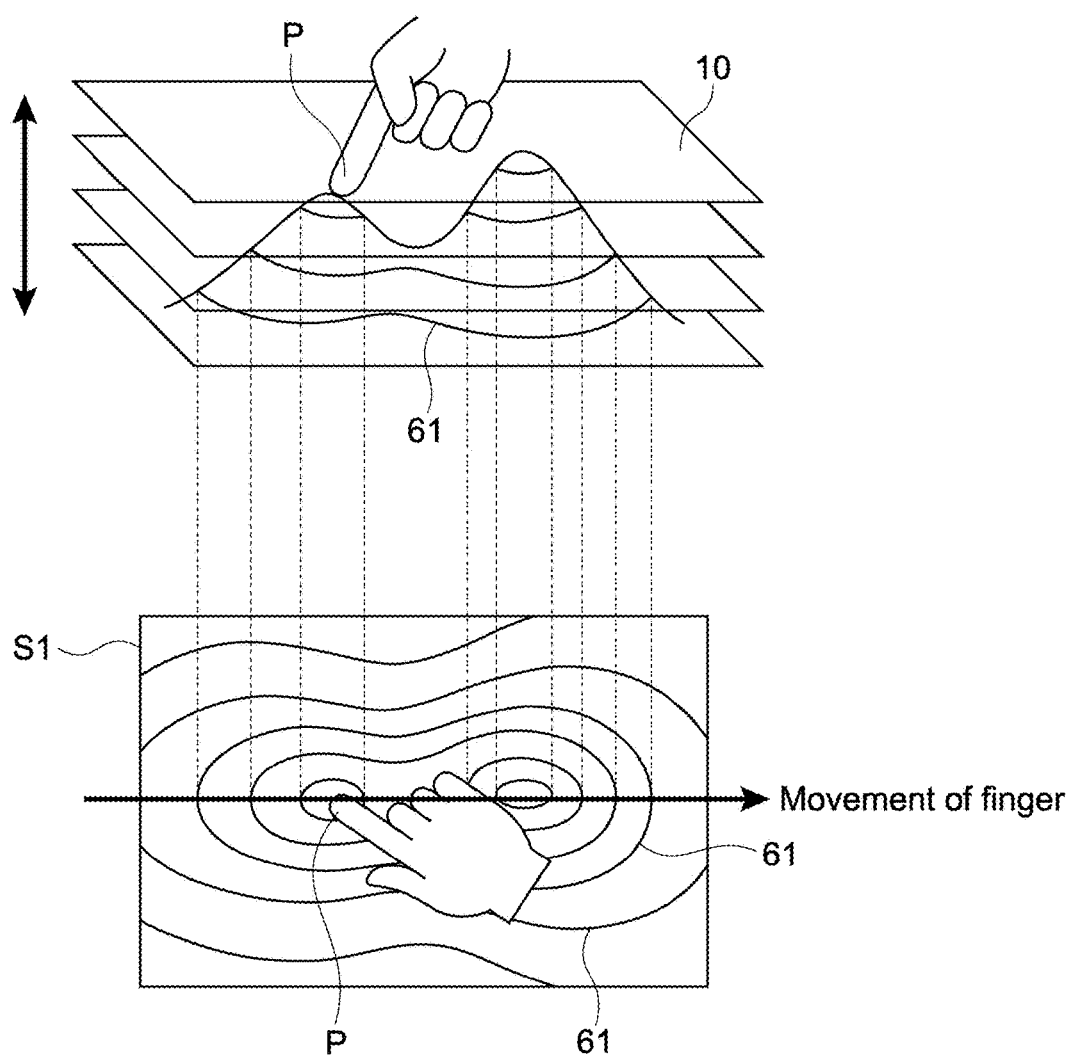
FIG. 21 A diagram for describing another application example (application example 1) of the tactile sense presentation apparatus.

FIG. 21 is a diagram for describing another application example (application example 1) of the tactile sense presentation apparatus. For example, the tactile sense presentation apparatus includes a map application as application software (hereinafter, referred to simply as application). The map application is configured to obtain altitude data (height data) from a server, for example. The signal generation unit of the tactile sense presentation apparatus supplies, to the actuator unit 30 or 130, a driving signal such that a vibration having a variably controlled magnitude of a frictional force and a variably controlled direction thereof on the touch panel 10 (and the display panel) according to the movement of a finger P of a user is generated on the touch panel 10 (and the display panel integrated therewith).

Specifically, the controller (e.g., controller 50 shown in FIG. 3) of the tactile sense presentation apparatus operates as follows. First, the controller displays a map as a display screen S1 on a display panel (not shown). Moreover, the controller obtains the altitude data of the map area in the display screen S1 (e.g., height data of a contour 61). This altitude data correspond to the position data of the map.

The signal generation unit supplies a driving signal to the actuator unit on the basis of the altitude data of the position on the map corresponding to the position of the finger P of the user detected by the touch panel 10, under control by the controller. Accordingly, the touch panel 10 (and the display panel) vibrates by the driving signal, and a frictional force having at least different directions (the direction of the frictional force is changed according to the movement of the finger P) is generated, according to the position of the finger P. The change in the frictional force corresponds to the altitude data. Therefore, the tactile sense presentation apparatus is capable of presenting, to the user, a virtual upward slope feeling and a virtual downward slope feeling corresponding to the undulation of the contour, i.e., a concavo-convex feeling, according to the position of the finger P on the touch panel 10.

Moreover, the signal generation unit may supply the driving signal such that a vibration having a magnitude of a frictional force which is changed according to the speed at which the finger P moves on the touch panel is generated on the touch panel. For example, it may be possible to increase the magnitude of the frictional force as the speed of the movement of the finger increases.

Application Example 2

Figure 22:
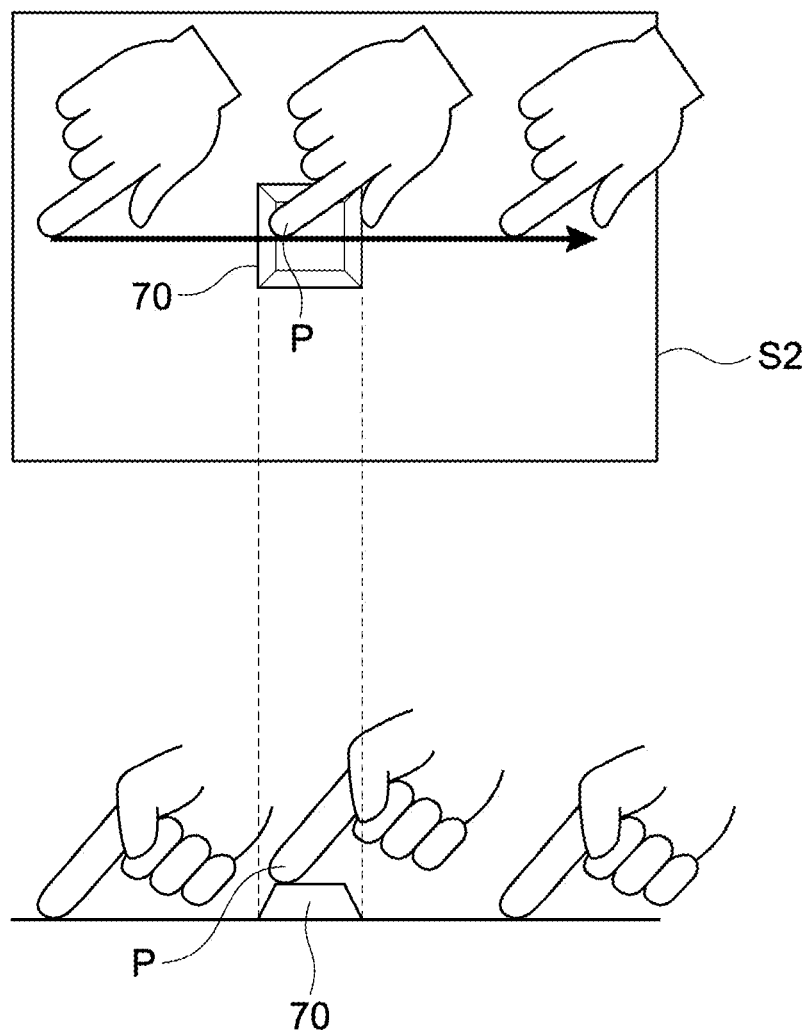
FIG. 22 A diagram for describing another application example (application example 2) of the tactile sense presentation apparatus.

FIG. 22 is a diagram for describing the application example 2 of the tactile sense presentation apparatus. In the application example 2, the tactile sense presentation apparatus presents a concavo-convex feeling according to the position of a button image 70 in a display screen S2 of the display panel.

The controller of the tactile sense presentation apparatus obtains outline shape data as the height data of the button image 70 as shown at the bottom in FIG. 22. The outline shape data may be data that is included by the tactile sense presentation apparatus in advance along with the image data of the display screen S2, or may be data that is obtained from a server along with the content data including text and image data in the case where the display screen S2 is a screen on a browser, for example.

In order to present, to the user, a virtual upward slope and downward slope feeling according to the position of the finger P of the user on the button image 70 in the display screen S2, specifically, outline shape data of the button, by using the method similar to that in the application example 1, the signal generation unit supplies a driving signal such that a vibration having a variably controlled frictional force is generated on the touch panel. It should be noted that as described above, the controller is capable of determining the user's operation of whether or not the user has pushed the button image 70, by using the actuator unit as a touch sensor.

In this application example 2, the tactile sense presentation apparatus does not need to display the display screen S2 including the button image 70 on the display panel, and in this case, the user can perform touch typing. In this case, for example, a visually impaired person can use this tactile sense presentation apparatus to feel the frictional force generated on the finger P, recognize a switch, button, or the like depending thereon, and to operate it.

Application Example 3

Figure 23:
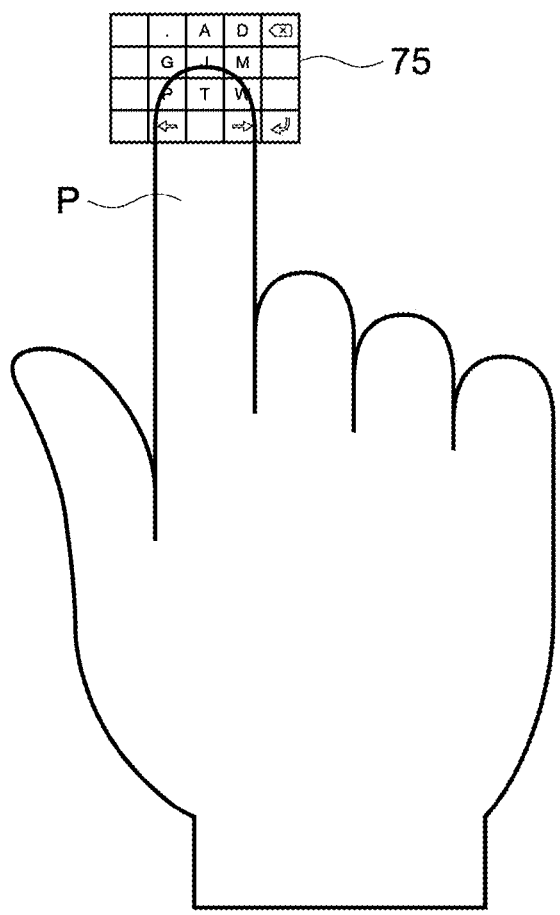
FIG. 23 A diagram for describing another application example (application example 3) of the tactile sense presentation apparatus.
Figure 24:
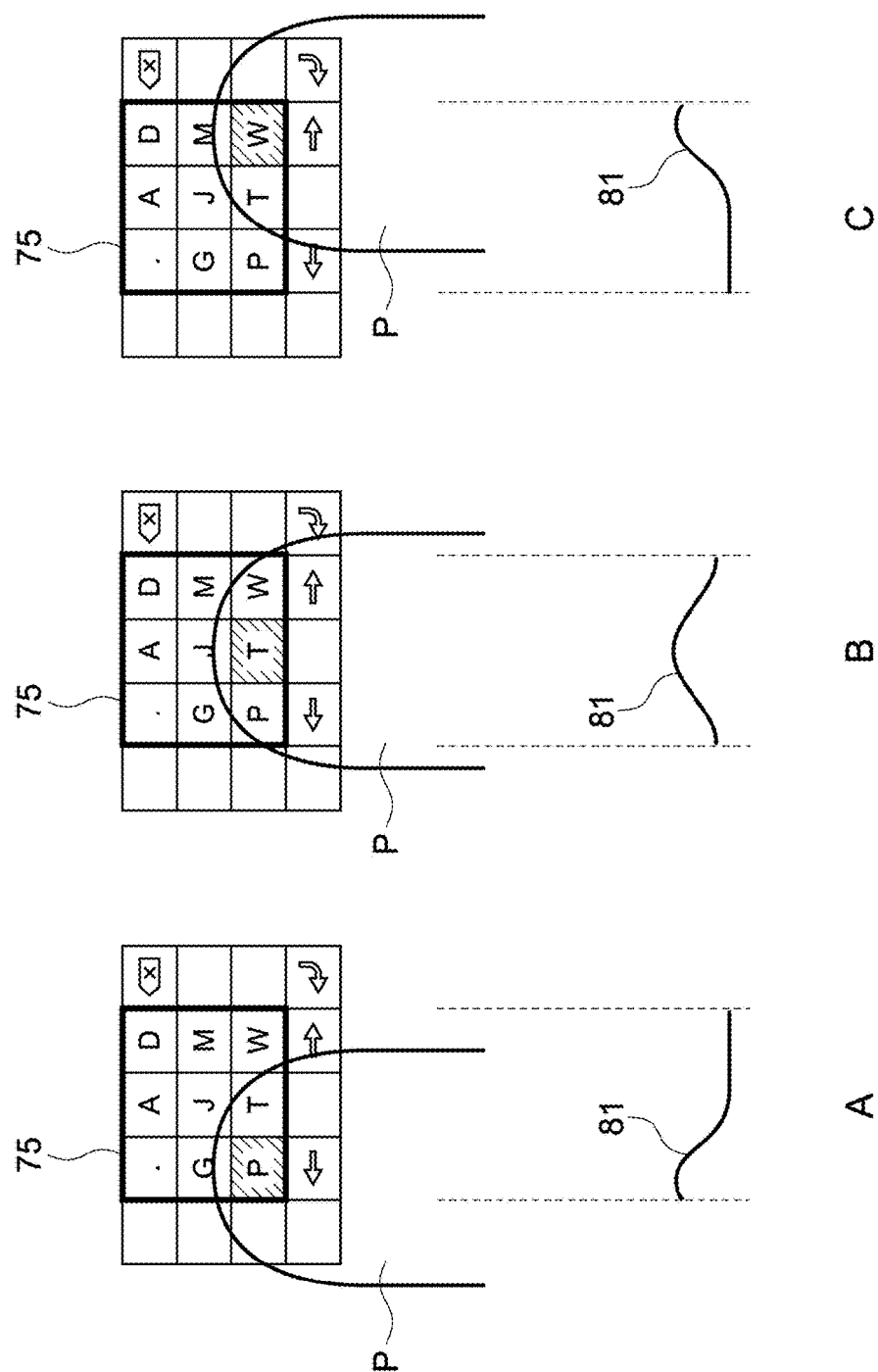
FIG. 24A A diagram showing the position of the finger on a keyboard and the height waveform for presenting a tactile sense corresponding thereto, in the application example 3.
FIG. 24B A diagram showing the position of the finger on a keyboard and the height waveform for presenting a tactile sense corresponding thereto, in the application example 3.
FIG. 24C A diagram showing the position of the finger on a keyboard and the height waveform for presenting a tactile sense corresponding thereto, in the application example 3.

FIGS. 23 and 24A to 24C are each a diagram for describing the application example 3 of the tactile sense presentation apparatus. As shown in FIG. 23, the tactile sense presentation apparatus includes a keyboard application including a keyboard image 75 having the area that is equal to or slightly larger than the area of the screen with which the finger P of the user is in contact, for example. The keyboard image 75 includes a plurality of keys. This keyboard application has a Japanese language function, for example, and is displayed in an n×m (n and m are each a natural number) matrix. In the following, the display area of a 3×3 matrix being an area of "." to "W" will be described as the range of the position of a finger on the touch panel. FIGS. 24A, 24B, and 24C show the state where the user inputs, on one line of the 3×3 matrix, "P," "T," and "W" on the third line, for example.

In the case where the finger P of the user is in contact with the vicinity of "P" (on the first column) and the user slightly moves the finger P, the tactile sense presentation apparatus supplies, to the actuator unit, such a driving signal that generates a frictional force. The direction of the frictional force in this case is a right direction, i.e., in the case where the user tries to slightly move the finger P toward the left side, the direction of the frictional force generated against the movement. At the bottom of FIGS. 24A to 24C, a waveform 81 representing the height on the basis of the same idea as that of the above-mentioned altitude data or outline shape data is schematically shown. Because a slope feeling toward the upper left side or a force sense toward the right side is presented to the user, the user can recognize that the key with which he/she is currently in contact is the key of "P" on the left side.

In the case where the finger P of the user is in contact with the vicinity of "T" (on the second column), the tactile sense presentation apparatus presents a tactile sense and a force sense by which the finger P is pushed by the touch panel 10 (and the display panel) in the upward direction (direction perpendicular to the screen). Accordingly, the user can recognize that the key with which he/she is currently in contact is the key of "T" at the center.

In the case where the finger P of the user is in contact with the vicinity of "W" (on the third column) and the user slightly moves the finger P, the tactile sense presentation apparatus supplies, to the actuator unit, such a driving signal that generates a frictional force. The direction of the frictional force in this case is a left direction, i.e., in the case where the user tries to move the finger P toward the right side, the direction of the frictional force generated against the movement. Accordingly, because a slope feeling toward the right side or a force sense toward the left side is presented to the user, the user can recognize that the key with which he/she is currently in contact is the key of "W" on the right side.

The well-known keyboard has allocated one character of text to the area of the finger or about the area in which the fingertip is in contact with the touch panel. In this case, after one character is input, in the case where the finger P is moved to input another character, the amount of movement is large and time loss occurs. On the other hand, according to the application example 3, it is possible to arrange keys corresponding to a plurality of characters in the range of a slight finger-running operation. Therefore, it is possible to achieve a keyboard having a small area and to shorten the movement distance of the finger P. Therefore, it is possible to improve the speed of character input.

Corresponding to the 3×3 matrix display, for example, the tactile sense presentation apparatus is capable of achieving an operation similar to the above-mentioned operation not only in the row direction as the horizontal direction but also in the column direction as the vertical direction.

In the case where the number of characters in the keyboard image is larger than 3×3, the magnitude of the frictional force may be changed. For example, it is possible to perform setting such that the frictional force increases as the position of the finger is closer to the end portion of the matrix display.

As described above, the tactile sense presentation apparatus according to the application example 3 is capable of presenting, to the user, various tactile senses according to the content of the application by generating, on the touch panel 10, a vibration having a variably controlled direction of the frictional force according to the contact position of the finger P, similarly to the application examples 1 and 2.

Application Example 4

FIGS. 25A and 25B are each a diagram for describing the application example 4 of the tactile sense presentation apparatus. The tactile sense presentation apparatus according to the application example 4 uses presentation of a downward slope feeling to provide a route guidance system (navigation system).

Figure 25:
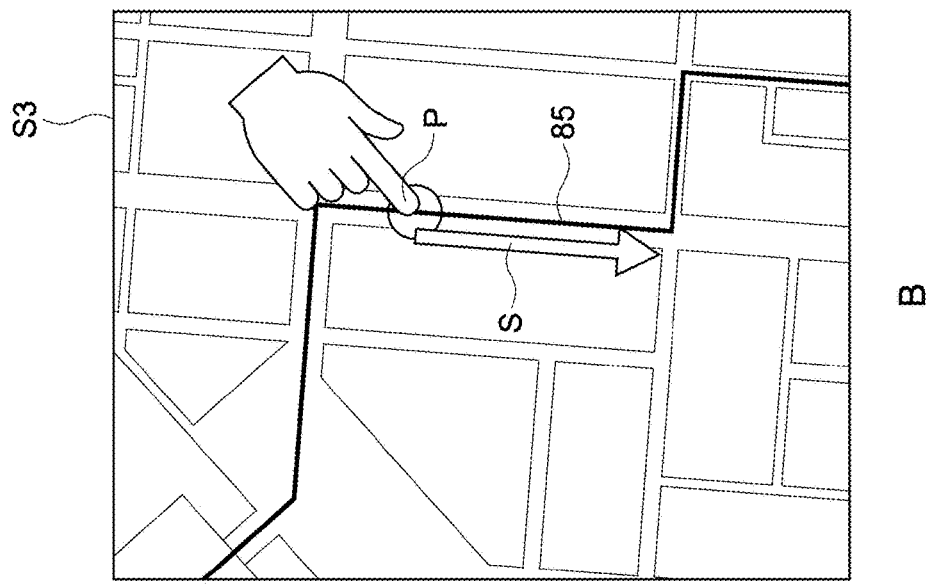
FIG. 25A A diagram for describing the application example 3.
FIG. 25B A diagram for describing the application example 3.
Figure 25:
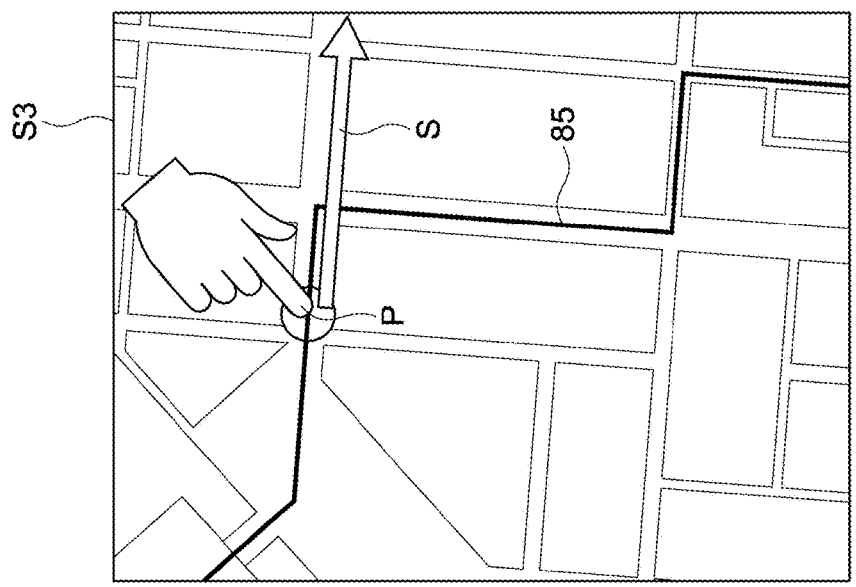

The tactile sense presentation apparatus includes a route guidance application, and displays, for example, a map as a display screen S3 as shown in FIGS. 25A and 25. The route guidance application is configured to be in synchronization with a GPS (Global Positioning System) as is known. The tactile sense presentation apparatus displays, on the map, a route 85 to the destination set by the controller. Herein, the route 85 is displayed with a bold line.

The signal generation unit generates a driving signal that vibrates the touch panel 10 so that the frictional force having directionality according to the traveling direction along the route from the position on the screen S3 with which the finger P of the user is in contact (e.g., present position) is generated under control by the controller. Specifically, as shown in FIG. 25A, in the case where the traveling direction is right as shown by a white arrow S on the screen, a downward slope feeling that leads the finger P that is in contact with the touch panel to right is presented. Specifically, in FIG. 25A, in the case where the user tries to move the finger P that is in contact with the present position toward left, the touch panel is driven so that a frictional force giving an upward slope feeling is generated.

It should be noted that the user can move in the direction along the force having the presented directionality without seeing the screen while holding the tactile sense presentation apparatus. Moreover, in this case, it does not need to display the map on the display panel.

Also according to the application example 4 described above, the tactile sense presentation apparatus is capable of presenting, to the user, various tactile senses according to the content of the application, by generating a vibration having at least a variably controlled direction of the frictional force out of the magnitude and direction of the frictional force according to the contact position of the finger P, on the touch panel 10.

It may be possible to further present, to the user, a tilt feeling of the road on the basis of the altitude data, with the magnitude of the frictional force, by combining the application example 4 and the above-mentioned example 1. In this case, the tactile sense presentation apparatus variably controls the magnitude and direction of the frictional force according to the position of the finger P.

At least two features in the embodiments described above may also be combined.

It should be noted that the present technology may also take the following configurations.

(1) A tactile sense presentation apparatus, including:
a movable body;
an actuator unit connected to the movable body; and
a signal generation unit configured to supply a driving signal to the actuator unit, the driving signal generating a vibration on the actuator unit, the vibration having within a period at least one of a plurality of different amplitudes and a plurality of different frequencies.

(2) The tactile sense presentation apparatus according to (1) above, in which
the signal generation unit is configured to generate the driving signal such that the actuator unit moves along a first direction under a first frequency and along a second direction opposite to the first direction under a second frequency different from the first frequency.

(3) The tactile sense presentation apparatus according to (1) or (2) above, in which
the signal generation unit is configured to generate the driving signal such that the actuator unit moves along a first direction under a first amplitude and along a second direction opposite to the first direction under a second amplitude different from the first amplitude.

(4) The tactile sense presentation apparatus according to any of (1) to (3) above, in which
the signal generation unit is configured to generate the driving signal such that a vibration having an amplitude and a frequency obtained on the basis of a detection threshold value of a tactile receptor is generated on the actuator unit.

(5) The tactile sense presentation apparatus according to (4) above, in which
the signal generation unit is configured to generate the driving signal such that vibrations including a vibration having a frequency corresponding to a tactile area of the tactile receptor and a vibration having a frequency corresponding to a non-tactile area of the tactile receptor are generated on the actuator unit.

(6) The tactile sense presentation apparatus according to (4) or (5) above, in which
the signal generation unit is configured to generate the driving signal such that vibrations including a vibration having an amplitude corresponding to the tactile area of the tactile receptor and a vibration having an amplitude corresponding to the non-tactile area of the tactile receptor are generated on the actuator unit.

(7) The tactile sense presentation apparatus according to (1) above, in which
the actuator unit includes at least a first actuator that moves the movable body along a direction of a first axis.

(8) The tactile sense presentation apparatus according to (7) above, in which
the actuator unit further includes a second actuator that moves the movable body along a direction of a second axis different from the first axis, and
the signal generation unit is configured to further supply the driving signal to the second actuator.

(9) The tactile sense presentation apparatus according to (8) above, in which
the signal generation unit is configured to synchronize timing of a peak value of the driving signal supplied to the first actuator with timing of a peak value of the driving signal supplied to the second actuator.

(10) The tactile sense presentation apparatus according to (8) above, in which
the signal generation unit is configured to displace timing of a peak value of the driving signal supplied to the first actuator from timing of a peak value of the driving signal supplied to the second actuator.

(11) The tactile sense presentation apparatus according to any of (7) to (10) above, in which
the actuator unit further includes a third actuator that moves the movable body along a direction of a third axis different from the first axis and the second axis, and the signal generation unit is configured to further supply the driving signal to the third actuator.

(12) The tactile sense presentation apparatus according to any of (1) to (11) above, in which the actuator unit includes a piezoelectric device, and functions as a touch sensor that detects position on the movable body, of a target object that touches the movable body.

(13) A tactile sense presentation apparatus, including:
a movable body;
an actuator unit connected to the movable body; and
a reception unit configured to receive a driving signal generating a vibration on the actuator unit, the vibration having within a period at least one of a plurality of different amplitudes and a plurality of different frequencies.

(14) A signal generation device, including:
a signal generation unit configured to generate a driving signal generating a vibration on an actuator unit connected to a movable body of a tactile sense presentation apparatus, the vibration having within a period at least one of a plurality of different amplitudes and a plurality of different frequencies; and
a transmission unit configured to transmit the generated driving signal.

(15) A signal generation device configured to supply, to an actuator unit connected to a movable body, a driving signal such that a vibration is generated on the movable body, the vibration providing directionality to a frictional force between the movable body and a target object being in contact with the movable body.

(16) A tactile sense presentation apparatus, including:
a movable body;
an actuator unit connected to the movable body; and
a signal generation unit configured to supply, to the actuator unit, a driving signal such that a vibration is generated on the movable body, wherein direction of a frictional force between the movable body and a target object that contacts the movable body is variably controlled.

(17) The tactile sense presentation apparatus according to (16) above, in which
the signal generation unit is configured to supply, to the actuator unit, a driving signal such that a vibration having magnitude of the frictional force variably controlled is generated on the movable body.

(18) The tactile sense presentation apparatus according to (16) above, in which
The movable body includes a touch panel, and
the signal generation unit supplies the driving signal to variably control the direction of the frictional force, according to a position of the target object detected by the touch panel.

(19) The tactile sense presentation apparatus according to (18) above, further including
a display panel on the movable body, in which the signal generation unit supplies the driving signal to variably control the direction of the frictional force on the basis of height data of a touching position of the target object, which is data on a height of an image displayed on the display panel.

(20) The tactile sense presentation apparatus according to (18) above, further including
a display panel on the movable body, in which the signal generation unit supplies the driving signal to variably control the frictional force on the basis of a position of one key touching the target object, among a plurality of keys included in a keyboard image displayed on the display panel

(21) The tactile sense presentation apparatus according to any of (16) to (20), in which the signal generation unit generates, on the movable body, a vibration that generates a frictional force against a movement of the target object to express a virtual upward slope feeling, and generates, on the movable body, a vibration that generates a force along the movement of the target object to express a virtual downward slope feeling.

(22) A tactile sense presentation system, including:
a tactile sense presentation apparatus including
a movable body,
an actuator unit connected to the movable body, and
a reception unit configured to receive a signal from outside; and
a signal generation device including
a signal generation unit configured to generate a driving signal such that a vibration is generated on the actuator unit, the vibration having within a period at least one of a plurality of different amplitudes and a plurality of different frequencies, and
a transmission unit configured to transmit the generated driving signal to the tactile sense presentation apparatus.

(23) A tactile sense presentation method, including
supplying a driving signal to an actuator unit, the driving signal generating a vibration on the actuator unit, the vibration having within a period at least one of a plurality of different amplitudes and a plurality of different frequencies;
driving, by the actuator unit, the movable body connected to the actuator unit on the basis of the supplied driving signal.

(24) A tactile sense presentation method, including:
supplying, to an actuator unit connected to a movable body, a driving signal such that a vibration is generated on the movable body, wherein direction of a frictional force between the movable body and a target object that contacts the movable body is variably controlled; and
driving the movable body by the actuator unit supplied with the driving signal.

(25) The tactile sense presentation method according to (24) above, in which
the step of supplying the driving signal includes supplying, to the actuator unit, a driving signal such that a vibration having magnitude of the frictional force variably controlled is generated on the movable body.

(26) The tactile sense presentation method according to (24) or (25) above, further including
detecting a position of the target object on a touch sensor on the movable body, in which the step of supplying the driving signal includes supplying the driving signal to variably control the direction of the frictional force, according to the position of the target object detected by the touch sensor.

DESCRIPTION OF SYMBOLS

10 touch panel
30, 130 actuator unit
actuator
35X X actuator
35Y Y actuator
35Z Z actuator
37 elastic member
60 signal generation unit
100, 200, 120 tactile sense presentation apparatus
250 signal generation device

The invention claimed is:

1. A tactile sense presentation apparatus, comprising:
   a movable body;
   an actuator unit connected to the movable body, the actuator unit comprising a first actuator; and
   a signal generation unit configured to supply a driving signal to the first actuator such that the driving signal generates a vibration on the movable body, the vibration having, within a single vibration period of the movable body, a first amplitude and/or frequency during a first portion of the single vibration period in which the movable body is moved in a first direction and a second amplitude and/or frequency, different from the first amplitude and/or frequency, during a second portion of the single vibration period in which the movable body is moved in a second direction opposite to the first direction.

2. The tactile sense presentation apparatus according to claim 1, wherein
   the signal generation unit is configured to generate the driving signal such that the actuator unit moves the movable body along a first direction under a first frequency and along a second direction opposite to the first direction under a second frequency different from the first frequency.

3. The tactile sense presentation apparatus according to claim 1, wherein
   the signal generation unit is configured to generate the driving signal such that the actuator unit moves the movable body along a first direction by a first amplitude and along a second direction opposite to the first direction under a second amplitude different from the first amplitude.

4. The tactile sense presentation apparatus according to claim 1, wherein
   the signal generation unit is configured to generate the driving signal such that a vibration having an amplitude and a frequency obtained on the basis of a detection threshold value of a tactile receptor is generated on the actuator unit.

5. The tactile sense presentation apparatus according to claim 4, wherein
   the signal generation unit is configured to generate the driving signal such that vibrations including a vibration having a frequency corresponding to a tactile area of the tactile receptor and a vibration having a frequency corresponding to a non-tactile area of the tactile receptor are generated on the actuator unit.

6. The tactile sense presentation apparatus according to claim 4, wherein
   the signal generation unit is configured to generate the driving signal such that vibrations including a vibration having an amplitude corresponding to the tactile area of the tactile receptor and a vibration having an amplitude corresponding to the non-tactile area of the tactile receptor are generated on the actuator unit.

7. The tactile sense presentation apparatus according to claim 1, wherein
   the first actuator moves the movable body along a direction of a first axis.

8. The tactile sense presentation apparatus according to claim 7, wherein
   the actuator unit further includes a second actuator that moves the movable body along a direction of a second axis different from the first axis, and
   the signal generation unit is configured to further supply the driving signal to the second actuator.

9. The tactile sense presentation apparatus according to claim 8, wherein
   the signal generation unit is configured to synchronize timing of a peak value of the driving signal supplied to the first actuator with timing of a peak value of the driving signal supplied to the second actuator.

10. The tactile sense presentation apparatus according to claim 8, wherein
    the signal generation unit is configured to displace timing of a peak value of the driving signal supplied to the first actuator from timing of a peak value of the driving signal supplied to the second actuator.

11. The tactile sense presentation apparatus according to claim 7, wherein
    the actuator unit further includes a third actuator that moves the movable body along a direction of a third axis different from the first axis and the second axis, and
    the signal generation unit is configured to further supply the driving signal to the third actuator.

12. The tactile sense presentation apparatus according to claim 1, wherein
    the actuator unit includes a piezoelectric device, and functions as a touch sensor that detects position on the movable body, of a target object that touches the movable body.

13. A tactile sense presentation apparatus, comprising:
    a movable body;
    an actuator unit connected to the movable body, the actuator unit comprising a first actuator; and
    a reception unit configured to receive a driving signal and to supply the driving signal to the first actuator such that the driving signal generates a vibration on the movable body, the vibration having, within a single vibration period of the movable body, a first amplitude and/or frequency during a first portion of the single vibration period in which the movable body is moved in a first direction and a second amplitude and/or frequency, different from the first amplitude and/or frequency, during a second portion of the single vibration period in which the movable body is moved in a second direction opposite to the first direction.

14. A signal generation device, comprising:
    a signal generation unit configured to supply a driving signal to an actuator connected to a movable body of a tactile sense presentation apparatus such that the driving signal generates a vibration on the movable body, the vibration, having within a single vibration period of the movable body, a first amplitude and/or frequency during a first portion of the single vibration period in which the movable body is moved in a first direction and a second amplitude and/or frequency, different from the first amplitude and/or frequency, during a second portion of the single vibration period in which the movable body is moved in a second direction opposite to the first direction; and
    a transmission unit configured to transmit the generated driving signal.

15. A signal generation device configured to supply, to an actuator connected to a movable body, a driving signal such that a vibration is generated on the movable body, the vibration providing directionality to a frictional force between the movable body and a target object in contact with the movable body, wherein the signal generation device is configured to generate the driving signal such that the actuator moves the movable body, within a single vibration period of the movable body, along a first direction at a first frequency during a first portion of the single vibration period and along a second direction opposite to the first direction at a second frequency different from the first frequency during a second portion of the single vibration period.

16. A tactile sense presentation apparatus, comprising:
a movable body;
an actuator unit connected to the movable body, the actuator unit comprising a first actuator; and
a signal generation unit configured to supply, to the first actuator, a driving signal such that a vibration is generated on the movable body, wherein direction of a frictional force between the movable body and a target object that contacts the movable body is variably controlled, wherein the signal generation unit is configured to generate the driving signal such that the movable body moves, within a single vibration period of the movable body, along a first direction at a first frequency during a first portion of the single vibration period and along a second direction opposite to the first direction at a second frequency different from the first frequency during a second portion of the single vibration period.

17. The tactile sense presentation apparatus according to claim 16, wherein
the signal generation unit is configured to supply, to the actuator unit, a driving signal such that a vibration having magnitude of the frictional force variably controlled is generated on the movable body.

18. The tactile sense presentation apparatus according to claim 16, further comprising
a touch sensor on the movable body, wherein the signal generation unit supplies the driving signal to variably control direction of the frictional force, according to a position of the target object detected by the touch sensor.

19. The tactile sense presentation apparatus according to claim 18, further comprising
a display panel on the movable body, wherein the signal generation unit supplies the driving signal to variably control direction of the frictional force on the basis of height data of a touching position of the target object, which is data on a height of an image displayed on the display panel.

20. The tactile sense presentation apparatus according to claim 18, further comprising
a display panel on the movable body, wherein the signal generation unit supplies the driving signal to variably control the frictional force on the basis of a position of one key touching the target object, among a plurality of keys included in a keyboard image displayed on the display panel.

21. The tactile sense presentation apparatus according to claim 16, wherein
the signal generation unit generates, on the movable body, a vibration that generates a frictional force against a movement of the target object to express a virtual upward slope feeling, and a vibration that generates a force along the movement of the target object to express a virtual downward slope feeling.

22. A tactile sense presentation system, comprising:
a tactile sense presentation apparatus including
a movable body,
an actuator unit connected to the movable body, the actuator unit comprising a first actuator, and
a reception unit configured to receive a signal from outside; and a signal generation device including
a signal generation unit configured to generate a driving signal and to supply the driving signal to the first actuator such that a vibration is generated on the movable body, the vibration having within a vibration period at least one of a plurality of different amplitudes and a plurality of different frequencies, wherein the signal generation unit is configured to generate the driving signal such that the first actuator moves the movable body, within a single vibration period of the movable body, along a first direction at a first frequency during a first portion of the single vibration period and along a second direction opposite to the first direction at a second frequency different from the first frequency during a second portion of the single vibration period, and
a transmission unit configured to transmit the generated driving signal to the tactile sense presentation apparatus.

23. A tactile sense presentation method, comprising:
supplying a driving signal to an actuator unit, the actuator unit comprising a first actuator connected to a movable body, the driving signal generating a vibration on the movable body, the vibration having, within a single vibration period of the movable body, a first amplitude and/or frequency during a first portion of the single vibration period in which the movable body is moved in a first direction and a second amplitude and/or frequency, different from the first amplitude and/or frequency, during a second portion of the single vibration period in which the movable body is moved in a second direction opposite to the first direction;
driving, by the first actuator, the movable body connected to the first actuator on the basis of the supplied driving signal.

24. A tactile sense presentation method, comprising:
supplying, to an actuator unit connected to a movable body, the actuator unit comprising a first actuator, a driving signal such that a vibration is generated on the movable body, wherein direction of a frictional force between the movable body and a target object that contacts the movable body is variably controlled, wherein the driving signal is generated such that the first actuator moves the movable body, within a single vibration period of the movable body, along a first direction at a first frequency during a first portion of the single vibration period and along a second direction opposite to the first direction at a second frequency different from the first frequency during a second portion of the single vibration period; and
driving the movable body by the first actuator supplied with the driving signal.

25. The tactile sense presentation method according to claim 24, wherein
the step of supplying the driving signal includes supplying, to the actuator unit, a driving signal such that a vibration having magnitude of the frictional force variably controlled is generated on the movable body.

26. The tactile sense presentation method according to claim 24, further comprising:
detecting a position of the target object on a touch sensor on the movable body, wherein the step of supplying the driving signal includes supplying the driving signal to variably control the direction of the frictional force, according to the position of the target object detected by the touch sensor.

* * * * *